US012518248B2

(12) United States Patent
Demmer et al.

(10) Patent No.: US 12,518,248 B2
(45) Date of Patent: Jan. 6, 2026

(54) SHARED WORKSPACES

(71) Applicant: Salesforce, Inc., San Francisco, CA (US)

(72) Inventors: Michael Demmer, San Francisco, CA (US); Ilan Frank, Los Altos, CA (US); Matthew Wahl, San Francisco, CA (US); Andrew S. Morrison, Brooklyn, NY (US); Christopher Sullivan, Wellesley, MA (US); Colin Gibbs, San Francisco, CA (US); Jonathan Russell, Brooklyn, NY (US); Youny Jing Kuang, Long Beach, CA (US)

(73) Assignee: Salesforce, Inc., San Francisco, CA (US)

( * ) Notice: Subject to any disclaimer, the term of this patent is extended or adjusted under 35 U.S.C. 154(b) by 217 days.

(21) Appl. No.: 17/855,101

(22) Filed: Jun. 30, 2022

(65) Prior Publication Data
US 2024/0005277 A1 Jan. 4, 2024

(51) Int. Cl.
*G06Q 10/10* (2023.01)
*G06F 3/14* (2006.01)

(52) U.S. Cl.
CPC ............ *G06Q 10/103* (2013.01); *G06F 3/14* (2013.01)

(58) Field of Classification Search
CPC ..... G06Q 10/10; G06Q 10/101; G06Q 10/103
See application file for complete search history.

(56) References Cited

U.S. PATENT DOCUMENTS

| 8,214,747 | B1 * | 7/2012 | Yankovich | ............ G06F 9/4451 |
| | | | | 715/810 |
| 11,310,295 | B1 * | 4/2022 | Demmer | ............. H04L 65/4038 |
| 11,888,908 | B2 * | 1/2024 | Demmer | ................. H04L 51/52 |
| 2013/0014023 | A1 * | 1/2013 | Lee | ...................... G06Q 10/101 |
| | | | | 715/751 |

(Continued)

OTHER PUBLICATIONS

Benjamin, L. (2015). Mapping the workspace of a globally distributed "Agile" team. International Journal of Sociotechnology and Knowledge Development, 7(2), 45-62. (Year: 2015).*

(Continued)

*Primary Examiner* — Maria C Santos-Diaz
(74) *Attorney, Agent, or Firm* — Lee & Hayes, P.C.

(57) ABSTRACT

Generating a shared workspace communication is described. A communication platform can receive, from a first account of a first workspace associated with a first organization, a request to create a shared workspace between the first organization and a second organization associated with a second workspace, wherein the first workspace comprises a first set of functions and the second workspace comprises a second set of functions. Based on the request, the communication platform can generate the shared workspace which may be accessible to one or more first users associated with the first workspace and one or more second users associated with the second workspace. The communication platform can assign a set of permissions to interact with the shared workspace to the one or more first users and the one or more second users to interact with the shared workspace. In some examples, the communication platform may generate a channel in the shared workspace.

20 Claims, 10 Drawing Sheets

(56) References Cited

U.S. PATENT DOCUMENTS

| | | | | |
|---|---|---|---|---|
| 2013/0097234 | A1* | 4/2013 | Beinvel | G06Q 10/101 |
| | | | | 709/204 |
| 2018/0287982 | A1 | 10/2018 | Draeger et al. | |
| 2019/0007467 | A1* | 1/2019 | Powell | G06Q 10/1095 |
| 2019/0028287 | A1* | 1/2019 | Jin | G06F 16/13 |
| 2019/0098087 | A1* | 3/2019 | Johnston | G06F 16/13 |
| 2023/0069507 | A1* | 3/2023 | Demmer | H04L 12/1822 |
| 2023/0094554 | A1* | 3/2023 | Correa | H04L 9/0825 |
| | | | | 709/204 |
| 2023/0095050 | A1* | 3/2023 | Mclean | G06Q 10/06 |
| | | | | 705/301 |
| 2023/0206179 | A1* | 6/2023 | Fong | G06F 21/6209 |
| | | | | 715/751 |
| 2023/0214780 | A1* | 7/2023 | Fong | G06F 16/176 |
| | | | | 705/7.18 |
| 2023/0216816 | A1* | 7/2023 | Fong | G06Q 10/00 |
| | | | | 709/224 |
| 2023/0376515 | A1* | 11/2023 | Tanikella | G06Q 10/101 |
| 2024/0127185 | A1* | 4/2024 | Mclean | H04L 12/1822 |

OTHER PUBLICATIONS

D. Veiel, J. M. Haake and S. Lukosch, "Facilitating team-based adaptation of shared workspaces," 2010 International Symposium on Collaborative Technologies and Systems, Chicago, IL, USA, 2010, pp. 275-284, doi: 10.1109/CTS.2010.5478502. (Year: 2010).*

P. Benölken, M. Wewior and U. Lang, "A virtual workspace for distributed design and engineering tasks," 6th International Conference on Collaborative Computing: Networking, Applications and Worksharing (CollaborateCom 2010), Chicago, IL, USA, 2010, pp. 1-9 (Year: 2010).*

A. B. Belén Pelegrina, C. Rodríguez-Domínguez, M. L. Rodríguez, K. Benghazi and J. L. Garrido, "Integrating groupware applications into shared workspaces," 2010 Fourth International Conference on Research Challenges in Information Science (RCIS), Nice, France, 2010, pp. 557-568 (Year: 2010).*

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", Forbes, [online] [retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

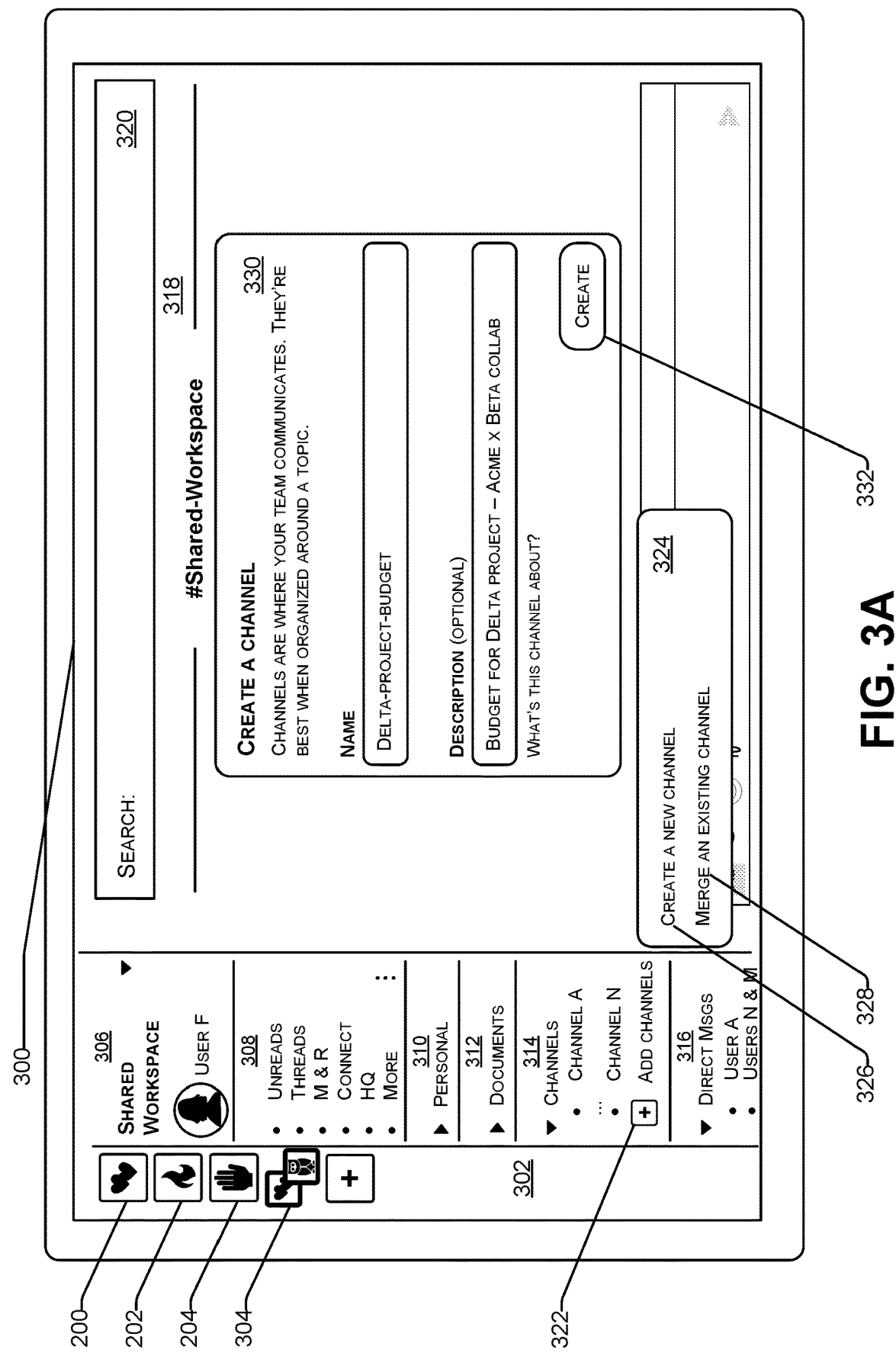

SHARED WORKSPACES

TECHNICAL FIELD

A communication platform can leverage a network-based computing system to enable users to exchange data. In some examples, users of the communication platform may communicate with other users of the communication platform via direct message (DM) communications, channels, and/or other virtual spaces. A DM, a channel, and/or another virtual space may include one or more data routes used for exchanging data between and among systems and devices associated with the communication platform. For example, a DM communication may be established between and among two or more user computing devices, allowing the two or more user computing devices to communicate and share data between and among each other over one or more networks (e.g., via the communication platform).

In some examples, data associated with a channel, a direct message, and/or other virtual space can be presented via a user interface. The data can include message objects, such as text, file attachments, emojis, and/or the like that are each posted by individual users of the communication platform. Users are then able to use features of the user interface in order to better communicate using the communication platform.

BRIEF DESCRIPTION OF THE DRAWINGS

The detailed description is described with reference to the accompanying figures. In the figures, the left-most digit of a reference number identifies the figure in which the reference number first appears. The use of the same reference number in different figures indicates similar or identical components or features. The figures are not drawn to scale.

FIG. 3A illustrates an example of a user interface associated with a new channel to a shared workspace, as described herein.

DETAILED DESCRIPTION

Figure 1:
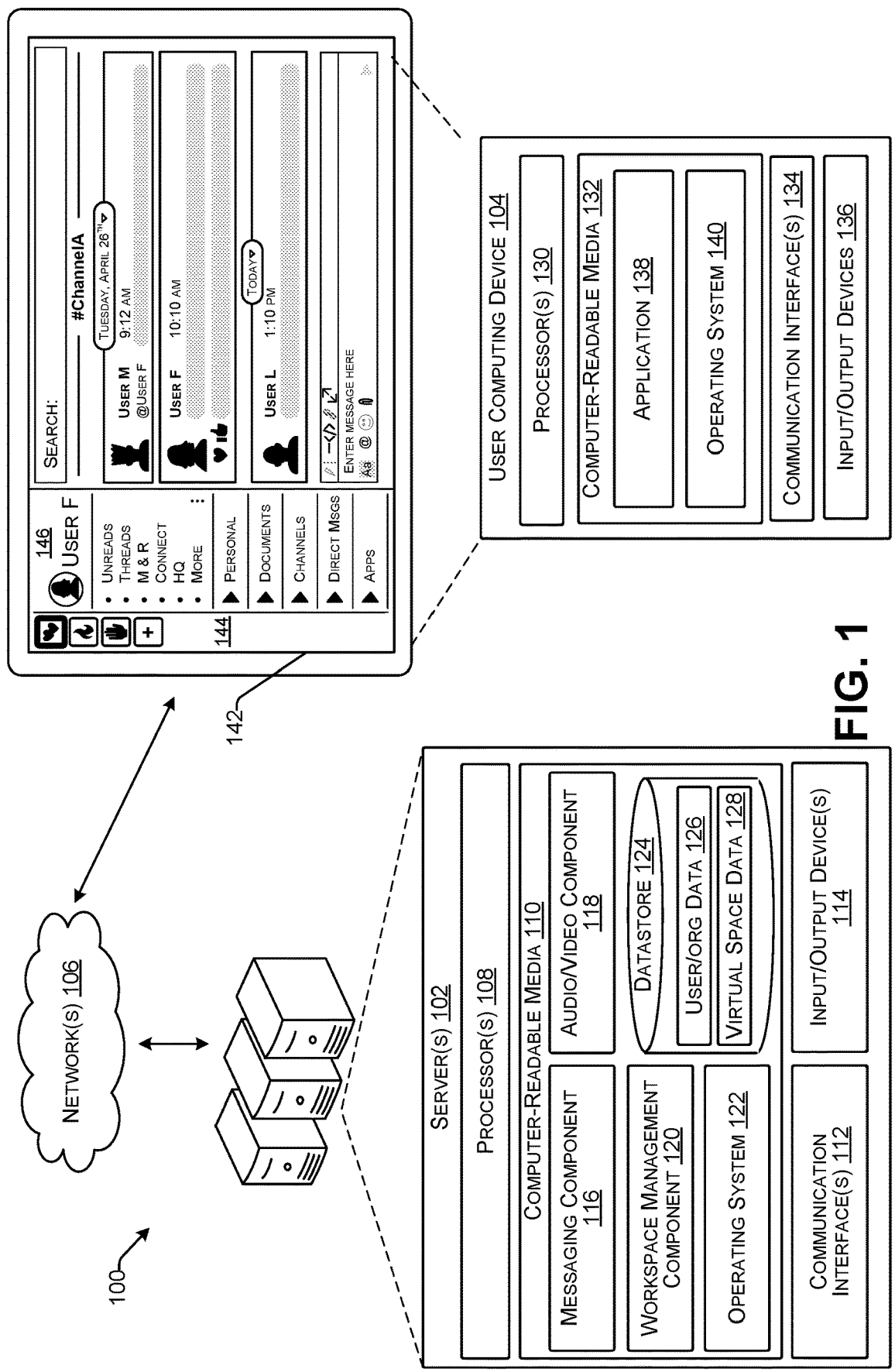
FIG. 1 illustrates an example environment for performing techniques described herein.

A communication platform may offer different types of virtual spaces for users of the communication platform to communicate between and among each other. In some examples, two or more users may communicate via a group-based communication workspace for a particular organization. That is, each group-based communication workspace can be accessible and viewable (via a user interface) to a select group of users, such as a group of employees of a business or organization (e.g., an ACME Corporation interface would be accessible and viewable to the ACME employees, however, a BETA Corporation group-based communication workspace would not be accessible and viewable to ACME employees). In some examples, each group-based communication workspace can include one or more channels (e.g., a marketing channel, sales channel, accounting channel, etc.), which may facilitate more individualized communications between users of the workspace. For example, an ACME Corporation workspace may be available to all ACME employees, while individual channels within the ACME workspace may be available to a subset of ACME employees.

In some examples, it may be desirable for users of multiple workspaces, such as those associated with different organizations, to communicate with one another (e.g. employees of both ACME Corporation and BETA Corporation). Existing techniques, such as a type of channel communicated called "shared channels," can allow a user of one workspace to create a channel in that user's respective workspace, and invite users of other workspaces to that channel. For example, an ACME employee may wish to collaborate on a project with a BETA employee. The ACME employee may create a new channel in the ACME workspace and invite the BETA employee to join the new channel, allowing both the ACME employee and the BETA employee to communicate in a designated location.

However, such current techniques are not without limitations. Because shared channels are controlled by the user and/or organization that created the shared channel, users of the other organization who have been invited to the shared channel are thereby limited in their ability to access and/or control the shared channel. For example, users may be prevented from adding other users to the shared channel or managing content posted to the channel, to name a few non-limiting examples. As such, the techniques described herein are directed to the generation and management of a shared workspace between users of two or more organizations in which the users have similar abilities in their access and control as it relates to the workspace.

As described above, it may be desirable for users of two or more organizations to communicate in a designated, shared workspace. For example, a first workspace may be associated with a first organization (e.g., an ACME Corporation) which may be accessible to a first account associated with a user of the first workspace (e.g., an ACME employee). The first workspace may include a first set of functions comprising controls associated with a management of the workspace, such as a retention policy, channel creation permissions, channel sharing permissions, channel membership permissions, and/or content permissions, to name a few non-limiting examples. In some examples, one or more users of the first workspace may wish to collaborate with one or more users of a second workspace, such as a second organization (e.g., a BETA Corporation). For example, the first organization and the second organization may have a relationship such as a business-client relationship, a supplier-provider relationship, a subsidiary-parent relationship, and/or a contractor-client relationship.

As described above, existing techniques limit the ability of these organizations to comminute with one another. For example, one current technique is to communicate via a channel-based communication (e.g., channels) accessible by users of both the first organization and the second organization. However, in the common instance of large-scale projects in which multiple organizations are in communication with one another, a multitude of channels may be required. As a project grows in scale, it may be confusing to users to differentiate and keep track of which channels are shared between multiple organizations and which channels are private and belong to their organization's workspace. This confusion may result in communications being lost and/or messages being sent to the wrong channel or workspace.

Furthermore, existing techniques limit channel functionality. For example, to create such a channel, an account associated with an organization (e.g., a first account of a first organization), must first create a channel in a workspace associated with the first organization. After the channel has been created, the first account can share the channel with accounts of a second organization, allowing users of both the first organization and the second organization to communicate with one another. However, based at least in part on the channel being associated with the first organization, the channel's functions may be different for members of the first organization versus members of the second organization. For example, members of the first organization, with which the channel is associated, may have more freedom in their ability to add new accounts to the channel, manage content in the channel, and/or share the channel, to name a few examples. As such, it may be desirable to create a workspace in which users of both the first organization and users of the second organization have access to the same or similar functionality.

Thus, techniques described herein are directed to a shared workspace accessible to members of multiple organizations. For instance, in at least one example, the techniques described herein are directed to the generation of a shared workspace accessible to one or more first users associated with a first workspace and one or more second users associated with a second workspace. Based at least in part on the one or more first users and the one or more second users being associated with the shared workspace, the one or more first users and/or the one or more second users may be assigned a set of permissions to interact with the shared workspace. In this way, the first users and the second users may have access to the same or similar functionality as it relates to the shared workspace, allowing for a more interactive, uniform, and collaborative communication environment.

In some examples, it may be desirable to include channels in the shared workspace. For example, based at least in part on receiving a request from the first user and/or the second user to generate a channel in the shared workspace, the communication platform may generate a new channel communication in the shared workspace, the communication platform consisting of at lease the first user and/or the second user. Similarly, an existing channel may be moved into the shared workspace from a different workspace, such as the first workspace or the second workspace.

For example, based at least in part on receiving a request to move a channel to the shared workspace, the communication platform may copy at least a portion of data associated with the existing workspace to the shared workspace.

In some examples, the first user and/or the second user may add a third user to the shared workspace. The third user may be a member of the first workspace, a member of the second workspace, a member of a third workspace different than the first workspace and the second workspace, and/or a member of a guest channel. In some examples, the third user may be assigned the same permissions as the first user and the second user. Alternatively, the third user may be assigned permissions different than that of the first account and/or the second account. Permissions may be assigned automatically upon the association to the shared workspace, and/or may be determined by a member of the shared workspace, such as the first user and/or the second user.

As described above, techniques described herein enable users to create and manage shared workspaces via a streamlined and efficient process. Therefore, these techniques provide for a faster "conversion" process (i.e., "converting" a workspace communication to a new shared workspace communication). Furthermore, techniques described herein provide user accounts with similar control regarding the functionality of the workspace, allowing users of both workspaces the ability to manage aspects of the workspace. As such, the techniques described herein provide improvements to existing computing processes by streamlining the creation of new, shared workspaces. Additional details and examples are described below with reference to FIGS. 1-6.

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, collaborative documents, canvases, audio/video conversations, and/or other virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, and/or the like.

The network(s) 106 can include but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a messaging component 116, an audio/video component 118, a workspace management component 120, an operating system 122, and a datastore 124.

In at least one example, the messaging component 116 can process messages between users. That is, in at least one example, the messaging component 116 can receive an outgoing message from a user computing device 104 and can send the message as an incoming message to a second user computing device 104. The messages can include direct messages sent from an originating user to one or more specified users and/or communication channel messages sent via a communication channel from the originating user to the one or more users associated with the communication channel. Additionally, the messages can be transmitted in association with a collaborative document, canvas, or other collaborative space. In at least one example, the canvas can include a flexible canvas for curating, organizing, and sharing collections of information between users. In at least one example, the collaborative document can be associated with a document identifier (e.g., virtual space identifier, communication channel identifier, etc.) configured to enable messaging functionalities attributable to a virtual space (e.g., a communication channel) within the collaborative document. That is, the collaborative document can be treated as, and include the functionalities associated with, a virtual space, such as a communication channel. The virtual space, or communication channel, can be a data route used for exchanging data between and among systems and devices associated with the communication platform.

In at least one example, the messaging component 116 can establish a communication route between and among various user computing devices, allowing the user computing devices to communicate and share data between and among each other. In at least one example, the messaging component 116 can manage such communications and/or sharing of data. In some examples, data associated with a virtual space, such a collaborative document, can be presented via a user interface. In addition, metadata associated with each message transmitted via the virtual space, such as a time stamp associated with the message, a sending user identifier, a recipient user identifier, a conversation identifier and/or a root object identifier (e.g., conversation associated with a thread and/or a root object), and/or the like, can be stored in association with the virtual space.

In various examples, the messaging component 116 can receive a message transmitted in association with a virtual space (e.g., direct message instance, communication channel, canvas, collaborative document, etc.). In various examples, the messaging component 116 can identify one or more users associated with the virtual space and can cause a rendering of the message in association with instances of the virtual space on respective user computing devices 104. In various examples, the messaging component 116 can identify the message as an update to the virtual space and, based on the identified update, can cause a notification associated with the update to be presented in association with a sidebar of user interface associated with one or more of the user(s) associated with the virtual space. For example, the messaging component 116 can receive, from a first user account, a message transmitted in association with a virtual space. In response to receiving the message (e.g., interaction data associated with an interaction of a first user with the virtual space), the messaging component 116 can identify a second user associated with the virtual space (e.g., another user that is a member of the virtual space). In some examples, the messaging component 116 can cause a notification of an update to the virtual space to be presented via a sidebar of a user interface associated with a second user account of the second user. In some examples, the messaging component 116 can cause the notification to be presented in response to a determination that the sidebar of the user interface associated with the second user account includes an affordance associated with the virtual space. In such examples, the notification can be presented in association with the affordance associated with the virtual space.

In various examples, the messaging component 116 can be configured to identify a mention or tag associated with the message transmitted in association with the virtual space. In at least one example, the mention or tag can include an @mention (or other special character) of a user identifier that is associated with the communication platform. The user identifier can include a username, real name, or other unique identifier that is associated with a particular user. In response to identifying the mention or tag of the user identifier, the messaging component 116 can cause a notification to be presented on a user interface associated with the user identifier, such as in association with an affordance associated with the virtual space in a sidebar of a user interface associated with the particular user and/or in a virtual space associated with mentions and reactions. That is, the messaging component 116 can be configured to alert a particular user that they were mentioned in a virtual space.

In at least one example, the audio/video component 118 can be configured to manage audio and/or video communications between and among users. In some examples, the audio and/or video communications can be associated with an audio and/or video conversation. In at least one example, the audio and/or video conversation can include a discrete identifier configured to uniquely identify the audio and/or video conversation. In some examples, the audio and/or video component 118 can store user identifiers associated with user accounts of members of a particular audio and/or video conversation, such as to identify user(s) with appropriate permissions to access the particular audio and/or video conversation.

In some examples, communications associated with an audio and/or video conversation ("conversation") can be synchronous and/or asynchronous. That is, the conversation can include a real-time audio and/or video conversation between a first user and a second user during a period of time and, after the first period of time, a third user who is associated with (e.g., is a member of) the conversation can contribute to the conversation. The audio/video component 118 can be configured to store audio and/or video data associated with the conversation, such as to enable users with appropriate permissions to listen and/or view the audio and/or video data.

In some examples, the audio/video component 118 can be configured to generate a transcript of the conversation, and can store the transcript in association with the audio and/or video data. The transcript can include a textual representation of the audio and/or video data. In at least one example, the audio/video component 118 can use known speech recognition techniques to generate the transcript. In some examples, the audio/video component 118 can generate the transcript concurrently or substantially concurrently with the conversation. That is, in some examples, the audio/video component 118 can be configured to generate a textual representation of the conversation while it is being conducted. In some examples, the audio/video component 118 can generate the transcript after receiving an indication that the conversation is complete. The indication that the conversation is complete can include an indication that a host or administrator associated therewith has stopped the conversation, that a threshold number of meeting attendees have closed associated interfaces, and/or the like. That is, the audio/video component 118 can identify a completion of the conversation and, based on the completion, can generate the transcript associated therewith.

In at least one example, the audio/video component 118 can be configured to cause presentation of the transcript in association with a virtual space with which the audio and/or video conversation is associated. For example, a first user can initiate an audio and/or video conversation in association with a communication channel. The audio/video component 118 can process audio and/or video data between attendees of the audio and/or video conversation, and can generate a transcript of the audio and/or video data. In response to generating the transcript, the audio/video component 118 can cause the transcript to be published or otherwise presented via the communication channel. In at least one example, the audio/video component 118 can render one or more sections of the transcript selectable for commenting, such as to enable members of the communication channel to comment on, or further contribute to, the conversation. In some examples, the audio/video component 118 can update the transcript based on the comments.

In at least one example, the audio/video component 118 can manage one or more audio and/or video conversations in association with a virtual space associated with a group (e.g., organization, team, etc.) administrative or command center. The group administrative or command center can be referred to herein as a virtual (and/or digital) headquarters associated with the group. In at least one example, the audio/video component 118 can be configured to coordinate with the messaging component 116 and/or other components of the server(s) 102, to transmit communications in association with other virtual spaces that are associated with the virtual headquarters. That is, the messaging component 116 can transmit data (e.g., messages, images, drawings, files, etc.) associated with one or more communication channels, direct messaging instances, collaborative documents, canvases, and/or the like, that are associated with the virtual headquarters. In some examples, the communication channel(s), direct messaging instance(s), collaborative document(s), canvas(es), and/or the like can have associated therewith one or more audio and/or video conversations managed by the audio/video component 118. That is, the audio and/or video conversations associated with the virtual headquarters can be further associated with, or independent of, one or more other virtual spaces of the virtual headquarters.

In at least one example, the workspace management component 120 can manage workspaces. It may be noted that while the workspace management component 120 is described generally with respect to traditional workspaces (referred to as "workspaces"), this description is not intended to be so limiting, and may include other types of workspaces, such as shared workspaces (e.g., "shared workspaces"), as described herein. In at least one example, the communication platform can be partitioned into different workspaces, which can be associated with different groups of users, as described above. As described above, each workspace can be associated with a group identifier and one or more user accounts can be mapped to, or otherwise associated with, the group identifier. User(s) corresponding to such user account(s) can be "members" of the group.

In some examples, the workspace management component 120 can manage workspace generation. That is, the workspace management component 120 can receive requests from users to create new, individual workspaces, and the workspace management component 120 can generate group identifiers associated with the new workspace and associate the requesting user accounts with the workspace group identifiers. For example, the workspace management component 120 can cause a presentation of one or more selectable options to create a workspace. In response to receiving a selection to create a workspace, the workspace management component 120 may cause presentation of an interface associated with generating a new workspace. For example, the interface may include selectable options associated with a selection characteristics associated with the new workspace. The characteristics can include membership (e.g., associated users), context data (e.g., a number of messages, conversations, channels, etc.), permissions (e.g., private, public, shared, etc.), features (e.g., title, name, topic, label, description, etc.), and the like.

Similarly, the workspace management component 120 can, in some examples, manage channel generation. For example, the workspace management component 120 can provide a means by which a user can generate a new channel in a workspace. In such examples, the workspace management component 120 can enable the user to initiate a conversation with one or more other users that may or may not be associated with the workspace in which the new channel is associated. For example, the workspace management component 120 can cause a presentation of a selectable option to create a new channel. In response to receiving a selection to create a new channel, the workspace management component 120 may cause presentation of an interface associated with generating a new channel. The characteristics can include membership (e.g., associated users), context data (e.g., a number of messages, conversations, etc.), permissions (e.g., private, public, shared, etc.), features (e.g., title, name, topic, label, description, etc.), and the like.

In some examples, the workspace management component 120 can manage workspace membership. That is, the workspace management component 120 can receive requests to associate users with individual workspaces and the workspace management component 120 can associate user accounts associated with such users with group identifiers associated with the individual workspaces. For example, responsive to receiving a request to add a user to a workspace, the workspace management component 120 can associate a user account of the user with a group identifier of the workspace. The workspace management component 120 can disassociate user accounts and group identifiers, for example, when a user is removed from a workspace. In at least one example, the workspace management component 120 can manage cross-workspace data integration, as described herein. For example, the workspace management component 120 can detect updates to data associated with a workspace and can integrate such updated data into user interface(s) presented via user computing device(s) of user(s) associated with the workspace. Such data integration can be "cross-workspace" such that, regardless of which workspace a user is logged in to, the user can receive updated data associated with each of the workspaces of which he or she is a member and/or access data associated with each of the workspaces of which he or she is a member (pending permissions, as described below). That is, the workspace management component 120 can detect updates to data associated with a workspace and can integrate such updated data into user interface(s) presented via user computing device(s) of user(s) associated with the workspace. Similarly, the workspace management component 120 can facilitate cross-workspace operations. For example, the workspace management component 120 can facilitate messages between workspaces, searches between or across multiple workspaces, and the like. That is, in some examples, the workspace management component 120 may facilitate the ability for a search in user interface associated with one workspace to access and retrieve data from other workspaces.

In some examples, cross-workspace integration may include the incorporation of multiple workspaces and/or channels. For example, the workspace management component 120 can allow for existing channels to be integrated into workspaces, such as new and/or shared workspaces. That is, upon the generation of a new, shared workspace between one or more accounts of a first workspace and one or more users of a second workspace, one or more channels associated with the first workspace and/or the second workspace may be accessible to accounts associated with the shared workspace. For example, in response to receiving a request to create a new workspace (e.g., selection of the selectable option to initiate the generation process) the workspace management component 120 can present a selectable option to integrate one or more existing channels in the existing workspaces, such as the first workspace or the second workspace, with the new workspace. Additionally or alternatively, the workspace management component 120 may allow accounts associated with a workspace the ability to integrate or more existing channels with the new workspace after the generation of the new workspace, such as via the existing channel, existing workspace, or new workspace, to name a few non-limiting examples.

In at least one example, integrating existing channels into workspaces can include copying data associated with the existing channel to the workspace. In such an example, the data may be accessible via both the existing channel and the workspace to which the channel is moved to. In some examples, integrating the existing channel to the workspace may include transferring the data to the workspace, such that the data transferred to the workspace from the existing channel may not be accessible via the existing channel. In such examples, the existing channel may be frozen or disabled. In some examples, the server(s) 102 can provide an indicator, in association with the existing channel, indicating the data previously associated with the existing channel is available via a different workspace. The indicator may, in some examples, include a link to the different workspace such that, when selected by a user, the server(s) 102 causes the different workspace to be presented via a display. Additional details of operations that can be performed by the workspace management component 120 are described below.

In at least one example, the operating system 122 can manage the processor(s) 108, computer-readable media 110, hardware, software, etc. of the server(s) 102.

In at least one example, the datastore 124 can be configured to store data that is accessible, manageable, and updatable. In some examples, the datastore 124 can be integrated with the server(s) 102, as shown in FIG. 1. In other examples, the datastore 124 can be located remotely from the server(s) 102 and can be accessible to the server(s) 102 and/or user device(s), such as the user computing device 104. The datastore 124 can comprise multiple databases, which can include user/org data 126 and/or virtual space data 128. Additional or alternative data may be stored in the data store and/or one or more other data stores.

In at least one example, the user/org data 126 can include data associated with users of the communication platform. In at least one example, the user/org data 126 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the user/org data 126 can include data associated with functions, such as permission data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In at least one example, permissions can include an indication of individual users authorized access to particular communication channels, such as in private channels, private objects with limited access, and the like. In some examples, permissions can include an indication of one or more groups (e.g., organizations) associated with the channel and/or workspace, such as group(s) of users that are granted access to the channel and/or workspace. In some examples, permissions can include data associated with editing capabilities associated with particular users, such as whether the channel, workspace, or item therein is view only or editable by individual users.

In some examples, permissions can be associated with elements of the communication platform, such as channels and workspaces. For example, permissions can indicate restrictions on individual channels and/or workspaces, such as restrictions on user(s) associated with individual channels and/or workspaces, content associated with individual channels and/or workspaces, and the like. In some examples, permissions associated with a channel and/or workspace can be mapped to, or otherwise associated with, data associated with the channel in the channel data. For example, permissions associated with elements of the communication platform may be transferred in association with one or more elements of the communication platform. As described above, a channel may be integrated into a workspace, such as a shared workspace, and may have existing permissions associated with the data in that channel. Based at least in part on transferring and/or copying the data associated with the channel to the new workspace, the permissions associated with the channel may be mapped to the new workspace, such that the permissions associated with the channel in the new workspace may be the same or similar to the permissions associated with the channel in the channel's original location. In some examples, the permissions associated with the channel may be altered to be the same or similar to that of the new workspace. Additionally or alternatively, a user associated with the channel and/or the destination workspace may determine one or more permissions associated with the channel.

In some examples, permissions data can store permissions associated with individual users and/or groups of users of the communication platform. For example, permissions can be set automatically or by an administrator of the communication platform, an employer, enterprise, organization, or other entity that utilizes the communication platform, a team leader, a group leader, or other entity that utilizes the communication platform for communicating with team members, group members, an individual user, or the like.

In some examples, permissions associated with an individual user can be mapped to, or otherwise associated with, an account or profile within the user/org data 126. In some examples, permissions can indicate which users can communicate directly with other users, which channels a user is permitted to access, restrictions on individual channels, which channels a user is permitted to create, which workspaces the user is permitted to access, which workspaces a user is permitted to create, restrictions on individual workspaces, restrictions on content, and the like. In at least one example, permissions can support the communication platform by maintaining security for limiting access to a defined group of users. In some examples, such users can be defined by common access credentials, group identifiers, or the like, as described above. In at least one example, the user/org data 126 can include data associated with one or more organizations of the communication platform. In at least one example, the user/org data 126 can store data in organization profiles, which can store data associated with an organization, including, but not limited to, one or more user identifiers associated with the organization, one or more virtual space identifiers associated with the organization (e.g., workspace identifiers, communication channel identifiers, direct message instance identifiers, collaborative document identifiers, canvas identifiers, audio/video conversation identifiers, etc.), an organization identifier associated with the organization, one or more organization identifiers associated with other organizations that are authorized for communication with the organization, and the like.

In at least one example, the virtual space data 128 can include data associated with one or more virtual spaces associated with the communication platform. The virtual space data 128 can include textual data, audio data, video data, images, files, and/or any other type of data configured to be transmitted in association with a virtual space. Non-limiting examples of virtual spaces include workspaces, communication channels, direct messaging instances, collaborative documents, canvases, and audio and/or video conversations. In at least one example, the virtual space data can store data associated with individual virtual spaces separately, such as based on a discrete identifier associated with each virtual space. In some examples, a first virtual space can be associated with a second virtual space. In such examples, first virtual space data associated with the first virtual space can be stored in association with the second virtual space. For example, data associated with a collaborative document that is generated in association with a communication channel may be stored in association with the communication channel. For another example, data associated with an audio and/or video conversation that is conducted in association with a communication channel can be stored in association with the communication channel.

As discussed above, each virtual space of the communication platform can be assigned a discrete identifier that uniquely identifies the virtual space. In some examples, the virtual space identifier associated with the virtual space can include a physical address in the virtual space data 128 where data related to that virtual space is stored. A virtual space may be "public," which may allow any user within an organization (e.g., associated with an organization identifier) to join and participate in the data sharing through the virtual space, or a virtual space may be "private," which may restrict data communications in the virtual space to certain users or users having appropriate permissions to view. In some examples, a virtual space may be "shared," which may allow users associated with different organizations (e.g., entities associated with different organization identifiers) to join and participate in the data sharing through the virtual space. Shared virtual spaces (e.g., shared channels) may be public such that they are accessible to any user of either organization, or they may be private such that they are restricted to access by certain users (e.g., users with appropriate permissions) of both organizations.

In some examples, the datastore 124 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 124 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared virtual space).

In some examples, individual groups can be associated with a database shard within the datastore 124 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a virtual space can be associated with a database shard within the datastore 124 that stores data related to a particular virtual space identification. For example, a database shard may store electronic communication data associated with the virtual space, which enables members of that particular virtual space to communicate and exchange data with other members of the same virtual space in real time or near-real time. As discussed above, the communications via the virtual space can be synchronous and/or asynchronous. In at least one example, a group or organization can be the owner of the database shard and can control where and how the related data is stored.

In some examples, individual users can be associated with a database shard within the datastore 124 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, Application Programming Interfaces (APIs) (e.g., using API calls), HyperText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 130, computer-readable media 132, one or more communication interfaces 134, and input/output devices 136.

In at least one example, each processor of the processor(s) 130 can be a single processing unit or multiple processing units, and can include single or multiple computing units or multiple processing cores. The processor(s) 130 can comprise any of the types of processors described above with reference to the processor(s) 108 and may be the same as or different than the processor(s) 108.

The computer-readable media 132 can comprise any of the types of computer-readable media 132 described above with reference to the computer-readable media 110 and may be the same as or different than the computer-readable media 110. Functional components stored in the computer-readable media can optionally include at least one application 138 and an operating system 140.

In at least one example, the application 138 can be a mobile application, a web application, or a desktop application, which can be provided by the communication platform or which can be an otherwise dedicated application. In some examples, individual user computing devices associated with the environment 100 can have an instance or versioned instance of the application 138, which can be downloaded from an application store, accessible via the Internet, or otherwise executable by the processor(s) 130 to perform operations as described herein. That is, the application 138 can be an access point, enabling the user computing device 104 to interact with the server(s) 102 to access and/or use communication services available via the communication platform. In at least one example, the application 138 can facilitate the exchange of data between and among various other user computing devices, for example via the server(s) 102. In at least one example, the application 138 can present user interfaces, as described herein. In at least one example, a user can interact with the user interfaces via touch input, keyboard input, mouse input, spoken input, or any other type of input.

A non-limiting example of a user interface 142 is shown in FIG. 1. As illustrated in FIG. 1, the user interface 142 can present data associated with a shared workspace. That is, in some examples, the user interface 142 can integrate data from two or more workspaces into a single, shared workspace accessible by users of the two or more workspaces (e.g., a user of the user computing device 104). In some examples, the user interface 142 can include a first region 144, or pane, that includes indicator(s) (e.g., user interface element(s) or object(s)) associated with workspace(s) with which the user (e.g., account of the user) is associated. In some examples, the user interface 142 can include a second region 146, or pane, that includes indicator(s) (e.g., user interface element(s), affordance(s), object(s), etc.) representing data associated with the workspace(s) with which the user (e.g., account of the user) is associated. In at least one example, the second region 146 can represent a sidebar of the user interface 142. Additional details associated with the second region 146 and indicator(s) are described below with reference to FIG. 2.

In at least one example, the user interface 142 can include a third region 148, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 148 can be associated with the same or different workspaces. That is, in some examples, the third region 148 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 148 presents data associated with multiple workspaces, at least some data can be associated with an indication of which workspace the data is associated with. Additional details associated with the user interface 142, and the third region 148, are described below with reference to FIG. 2.

In at least one example, the operating system 140 can manage the processor(s) 130, computer-readable media 132, hardware, software, etc. of the server(s) 102.

The communication interface(s) 134 can include one or more interfaces and hardware components for enabling communication with various other devices (e.g., the user computing device 104), such as over the network(s) 106 or directly. In some examples, the communication interface(s) 134 can facilitate communication via Websockets, APIs (e.g., using API calls), HTTPs, etc.

The user computing device 104 can further be equipped with various input/output devices 136 (e.g., I/O devices). Such I/O devices 136 can include a display, various user interface controls (e.g., buttons, joystick, keyboard, mouse, touch screen, etc.), audio speakers, connection ports and so forth.

While techniques described herein are described as being performed by the messaging component 116, the audio/video component 118, the workspace management component 120, and the application 138, techniques described herein can be performed by any other component, or combination of components, which can be associated with the server(s) 102, the user computing device 104, or a combination thereof.

FIG. 2 illustrates additional details associated with the user interface 142 that presents data associated with shared workspaces, as described above with reference to FIG. 1.

As described above, in at least one example, the user interface 142 can include a first region 144, or pane, that includes indicator(s) (e.g., user interface element(s) or object(s)) of workspace(s) with which the user (e.g., account of the user) is associated. As illustrated in FIG. 2, the user (e.g., User F) can be associated with three different workspaces. In some examples, the workspaces can be associated with a same organization (e.g., associated with a same organization identifier). In some examples, one or more of the workspaces can be associated with different organizations (e.g., associated with different organization identifiers). In some examples, one of the workspaces can be associated with users from a single organization (e.g., associated with a same organization identifier) and another of the workspaces can be associated with users from two or more different organizations (e.g., associated with different organization identifiers).

In at least one example, each workspace can be associated with a different indicator 200-204, presented via the first region 144. In at least one example, a user account of the user (e.g., User F) can be associated with group identifiers that correspond to each of the workspaces (e.g., as determined by the user/org data 126 and/or the virtual space data 128). As such, the user account of the user can be associated with each of the workspaces. A first indicator 200 can represent a first workspace, a second indicator 202 can represent a second workspace, and a third indicator 204 can represent a third workspace.

In some examples, the user can navigate between the workspaces by actuating a control associated with each of the indicators 200-204 without needing to log out of one workspace and log in to each of the other workspaces. Non-limiting examples of such indicators, or any indicators described herein, can include icons, symbols, links, tabs, or other user interface elements or objects. In some examples, such indicators can be associated with actuation mechanisms to enable a user to select an indicator and transition to another workspace. In some examples, a visual indicator can indicate which workspace a user is currently interacting with and/or most recently interacted with. For example, the first indicator 200 is outlined in a heavier weight than the second indicator 202 and the third indicator 204, thereby indicating which workspace the user is currently interacting with and/or most recently interacted with. In some examples, the indicators 200-204 can be associated with another indicator indicating that the corresponding workspace has been updated. An example is shown with respect to the third indicator 204.

While three indicators 200-204 are illustrated in FIG. 2, the user can be associated with any number of workspaces. In some examples, indicators associated with all of the workspaces with which a user is associated can be presented via the first region 144. In some examples, some of the indicators associated with all of the workspaces with which a user is associated can be presented via the first region 144 and the user can interact with the user interface 142 to view additional or alternative indicators. In examples where fewer than all workspaces are represented via the user interface 142, the indicators can be arranged in alphabetical order, in an order of most recent interaction, in an order based on most frequent interaction, or some other order.

In some examples, the first region 144 may not be included in the user interface 142, and such information can be integrated into the user interface 142 via additional or alternative mechanisms.

In some examples, the user interface 142 can include a second region 146, or pane, that includes indicator(s) (e.g., user interface element(s) or object(s)) representing virtual space(s) associated with the workspace(s) with which the user (e.g., account of the user) is associated. In at least one example, the second region 146 can represent a sidebar of the user interface 142. In at least one example, the second region 146 can include one or more sub-sections, or sub-panes, which can represent different virtual spaces. For example, a first sub-section 206 can include indicators representing virtual spaces that can aggregate data associated with a plurality of virtual spaces of which the user is a member. In at least one example, each virtual space can be associated with an indicator in the first sub-section 206. In some examples, an indicator can be associated with an actuation mechanism (e.g., affordance) such that when actuated, can cause the application 138 to present data associated with the corresponding virtual space via the third region 148. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the third region 148, for example in a feed. In such examples, different types of events and/or actions, which can be associated with different virtual spaces, can be presented via a same feed. In some examples, such data can be organized and/or is sortable by associated virtual space (e.g., virtual space via which the communication was transmitted), time, type of action, user, and/or the like. In some examples, such data can be associated with an indication of which user (e.g., member of the associated virtual space) posted the message and/or performed an action.

In some examples, a virtual space can be associated with a same type of event and/or action. For example, "threads" can be associated with messages, files, etc. posted in threads to messages posted in a virtual space and "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. That is, in some examples, same types of events and/or actions, which can be associated with different virtual spaces, can be presented via a same feed. As with the "unreads" virtual space, data associated with such virtual spaces can be organized and/or is sortable by virtual space, time, type of action, user, and/or the like.

In some examples, a virtual space can be associated with facilitating communications between a user and other users of the communication platform. For example, "connect" can be associated with enabling the user to generate invitations to communicate with one or more other users. In at least one example, responsive to receiving an indication of selection of the "connect" indicator, the communication platform can cause a connections interface to be presented in the third region 148.

In some examples, a virtual space can be associated with a group (e.g., organization, team, etc.) headquarters (e.g., administrative or command center). In at least one example, the group headquarters can include a virtual or digital headquarters for administrative or command functions associated with a group of users. For example, "HQ" can be associated with an interface including a list of indicators associated with virtual spaces configured to enable associated members to communicate. In at least one example, the user can associate one or more virtual spaces with the "HQ" virtual space, such as via a drag and drop operation. That is, the user can determine relevant virtual space(s) to associate with the virtual or digital headquarters, such as to associate virtual space(s) that are important to the user therewith.

Though not illustrated, in some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via the user interface 142 (e.g., in the third region 148). In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

Additionally, though not illustrated, in some examples, a virtual space can be associated with one or more canvases with which the user is associated. In at least one example, the canvas can include a flexible canvas for curating, organizing, and sharing collections of information between users. That is, the canvas can be configured to be accessed and/or modified by two or more users with appropriate permissions. In at least one example, the canvas can be configured to enable sharing of text, images, videos, GIFs, drawings (e.g., user-generated drawing via a canvas interface), gaming content (e.g., users manipulating gaming controls synchronously or asynchronously), and/or the like. In at least one example, modifications to a canvas can include adding, deleting, and/or modifying previously shared (e.g., transmitted, presented) data. In some examples, content associated with a canvas can be sharable via another virtual space, such that data associated with the canvas is accessible to and/or rendered interactable for members of the virtual space.

In some examples, if the first sub-section 206 includes a user interface element representative of a virtual space associated with audio and/or video communications (e.g., conversations, multimedia clips (e.g., videos, audio files, stories, etc.), etc.) that is actuated by a user, audio and/or video data associated with the user, which can be associated with different audio and/or video conversations, multimedia clips, stories, and/or the like, can be presented via the third region 148. In some examples, such audio and/or video data can be presented via a feed. For the purpose of this discussion, audio and/or video data can correspond to audio and/or video content provided by a user associated with the communication platform.

In at least one example, the second region 146 of the user interface 142 can include a second sub-section 208, or sub-pane, that is a personalized sub-section associated with personal documents that are associated with the user account. In at least one example, the user can select personal documents to associate with the second sub-section 208, such as by dragging and dropping, pinning, or otherwise associating selected personal documents into the second sub-section 208. As discussed above, personal documents can include collaborative documents in which the user is a sole member. For example, a personal document can include a to do list, a document with saved items, and/or the like.

In at least one example, the second region 146 of the user interface 142 can include a third sub-section 210, or sub-pane, or sub-pane, associated with collaborative documents that are associated with the user account of the user. That is, a "documents" sub-section can include affordances associated with one or more collaborative documents of which the user is a member. In various examples, the communication platform can determine one or more collaborative documents to be associated with the documents sub-section (e.g., third sub-section 210) based on one or more ranking criteria. That is, the communication platform can cause affordances associated with highest ranking collaborative documents of which the user is a member to be presented in the documents sub-section. In some examples, the user can pin or otherwise associate one or more collaborative documents with the third sub-section 210. For example, the user can drag an affordance or other indicator associated with a collaborative document to the third sub-section 210 and release the selected collaborative document therein. In response to the drag-and-drop action, the communication platform can associate the selected collaborative document with the third sub-section 210 and cause presentation of an affordance of the selected collaborative document therein.

In at least one example, a label or other indicator associated with the third sub-section 210 can include an affordance that, when selected by the user, causes a documents interface to be presented in the third region 148 of the user interface 142. In some examples, the documents interface can include one or more lists of collaborative document(s) with which the user account of the user is associated. For example, the documents interface can include a first list of personal collaborative documents associated with the user account and a second list of collaborative documents that include two or more members.

In at least one example, the second region 146 of the user interface 142 can include a fourth sub-section 212, or sub-pane, that includes indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the fourth sub-section 212 can depict all communication channels, or a subset of all communication channels, that the user has permission to access (e.g., as determined by the permission data). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the fourth sub-section 212 can depict all communication channels, or a subset of all communication channels, that the user is a member of, and the user can interact with the user interface 142 to browse or view other communication channels that the user is not a member of but are not currently displayed in the fourth sub-section 212. In some examples, different types of communication channels (e.g., public, private, shared, cross-workspace, etc.) can be in different sections of the fourth sub-section 212, or can have their own sub-regions or sub-panes in the user interface 142. In some examples, communication channels associated with different workspaces can be in different sections of the fourth sub-section 212 or can have their own regions or panes in the user interface 142. For example, the fourth sub-section 212 can display communication channels based on the workspace(s) the channel is associated with. For example, the fourth sub-section 212 may display the channels associated with the workspace the user is currently accessing (e.g., Workspace B as depicted in the current illustration). However, in other examples, the fourth sub-section 212 may display channels associated with multiple workspaces the channels are associated with, such as indicators 200 and 204.

In some examples, the indicators can be associated with graphical elements that visually differentiate types of communication channels, such as a lock graphical element (not illustrated). As a non-limiting example, and for the purpose of this discussion, the lock graphical element can indicate that the associated communication channel, Channel A, is private and access thereto is limited, whereas another communication channel, Channel N, is public and access thereto is available to any member of an organization with which the user is associated. In some examples, additional or alternative graphical elements can be used to differentiate between shared communication channels, communication channels associated with different workspaces, communication channels with which the user is or is not a current member, and/or the like.

In at least one example, the second region 146 can include a fifth sub-section 214, or sub-pane, that can include indicators representative of communications with individual users or multiple specified users (e.g., instead of all, or a subset of, members of an organization). Such communications can be referred to as "direct messages." That is, the fifth sub-section 214, or sub-pane, can include indicators representative of virtual spaces that are associated with private messages between one or more users.

Additionally, though not illustrated, the second region 146 can include a sub-section that is a personalized sub-section associated with a team of which the user is a member. That is, the "team" sub-section can include affordance(s) of one or more virtual spaces that are associated with the team, such as communication channels, collaborative documents, direct messaging instances, audio or video synchronous or asynchronous meetings, and/or the like. In at least one example, the user can associate selected virtual spaces with the team sub-section, such as by dragging and dropping, pinning, or otherwise associating selected virtual spaces with the team sub-section.

As described above, in at least one example, the user interface 142 can include a third region 148 or pane, that is associated with a feed indicating messages posted to and/or actions taken with respect to a virtual space (e.g., a virtual space associated with direct message communication(s), a virtual space associated with communication channel communication(s), a virtual space associated with collaborative document communication(s) (e.g., via a messaging or chat interface within a collaborative document), a virtual space associated with audio and/or video communications, etc.) for facilitating communications. As described above, in at least one example, data associated with the third region 148 can be associated with the same or different workspaces. That is, in some examples, the third region 148 can present data associated with the same or different workspaces via an integrated feed. In some examples, the data can be organized and/or is sortable by time, type of action, virtual space, user, or the like. In some examples, such data can be associated with an indication of which user posted the message and/or performed an action. In examples where the third region 148 presents data associated with multiple workspaces or other virtual spaces, at least some data can be associated with an indication of which workspace or other virtual space the data is associated with.

Figure 2A:
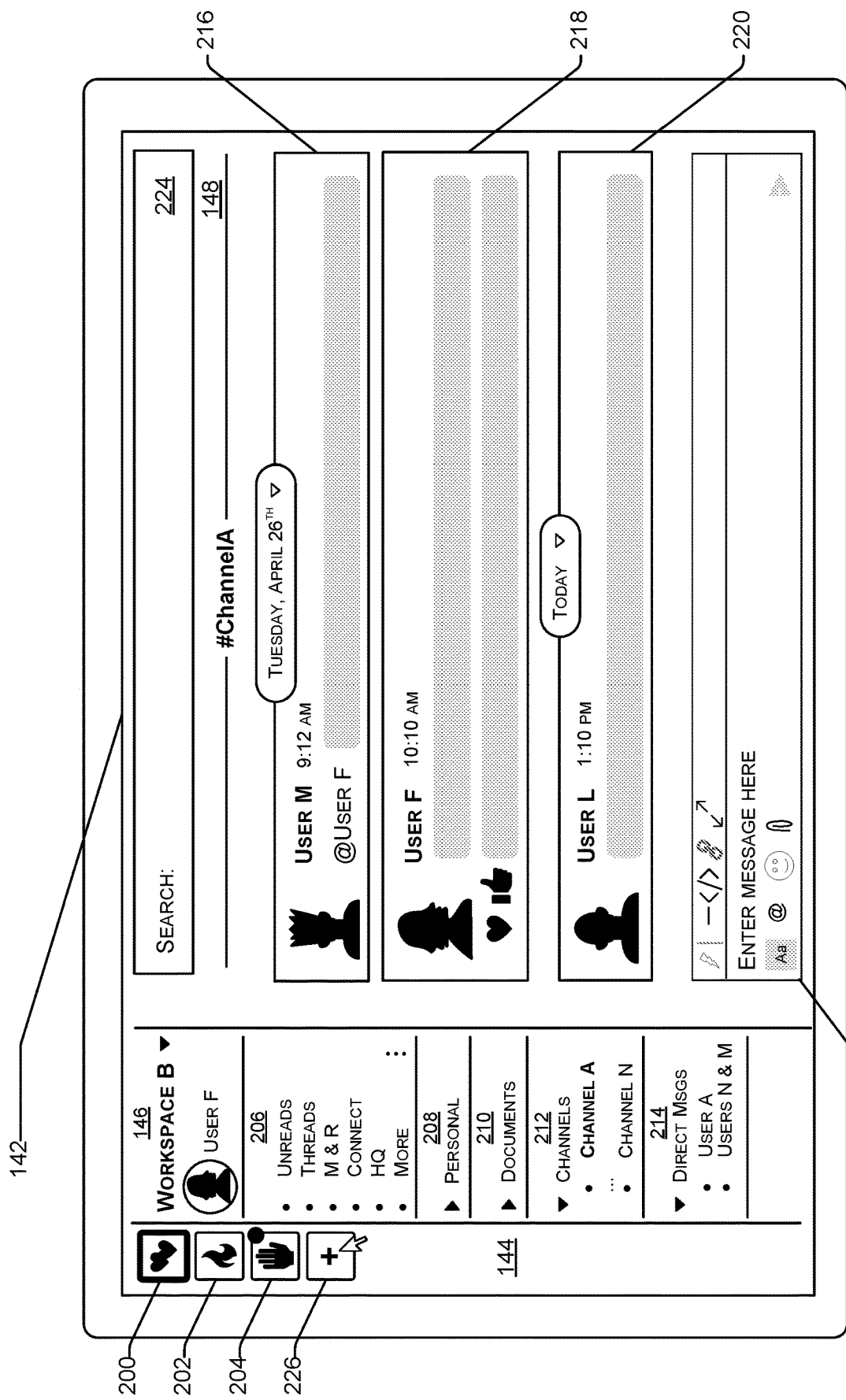
FIG. 2A illustrates an example user interface associated with generating a shared workspace, as described herein.

For example, in FIG. 2A, the user (e.g., User F), can interact with the user interface 142 to view data associated with the virtual space corresponding to "Channel A" in Workspace B In FIG. 2A, data associated with the virtual space can be associated with different communication channels and different workspaces. As illustrated, the data is organized by communication channel (e.g., #ChannelA). Though this is not intended to be so limiting, and the data can be organized and/or sortable by virtual space, time, type of action, user, and/or the like. As illustrated, another user (e.g., User M) mentioned the user (e.g., User F) in a message, represented by the indicator 216 (e.g., a user interface element, object, etc.), which is associated with a communication channel (e.g., #ChannelA). The user (e.g., User F) also posted a message, represented by the indicator 218 (e.g., a user interface element, object, etc.), in the same communication channel (Channel A). One or more other users reacted to the message, represented by the indicator 220, with an emoji. Additionally, as illustrated, a third message, represented by the indicator 220 (e.g., a user interface element, object, etc.), sent by another user (e.g., User L) which is also associated with the same communication channel as the previous messages sent to third region 148. As such, indicators associated with multiple messages (e.g., messages represented by indicators 216, 218, and 220) can be presented in the third region 148. Although the current illusion depicts a single channel (Channel A) in the user interface 142, any number of channels may be depicted.

In some examples, the third region 148 can include a response field represented by the indicator 222. The response field may include a selectable text box in which a user associated with an account (e.g., User F) may send content to a communication channel and/or other virtual space (e.g., Channel A). For example, a user may post a message, respond to a message, attach a file, or send a gif, to name a few non-limiting examples.

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

In some examples, a user can comment on a message in a "thread." A thread can be a message associated with another message that is not posted to a communication channel, but instead is maintained within an object associated with the original message. Messages and/or threads can be associated with file(s), emoji(s), app(s), etc.

A communication channel or other virtual space can be associated with data and/or content other than messages, or data and/or content that is associated with messages. For example, non-limiting examples of additional data that can be presented via the third region 148 of the user interface 142 include collaborative documents (e.g., documents that can be edited collaboratively, in real-time or near real-time, etc.), audio and/or video data associated with a conversation, members added to and/or removed from the communication channel, file(s) (e.g., file attachment(s)) uploaded and/or removed from the communication channel), application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

In some examples, the third region 148 can comprise a feed associated with a single virtual space. In such examples, data associated with the virtual space can be presented via the feed. In at least one example, data associated with a virtual space can be viewable to at least some of the users of a group of users associated with a same group identifier, such as users with appropriate permissions to access the virtual space. In some examples, for members of a virtual space, the content of the virtual space (e.g., messaging communications) can be displayed to each member of the virtual space. For instance, a common set of group-based messaging communications can be displayed to each member of the virtual space such that the content of the virtual space (e.g., messaging communications) may not vary per member of the virtual space. In some examples, data associated with a virtual space can appear differently for different users (e.g., based on personal configurations, group membership, etc.).

In at least one example, the format of the individual virtual spaces may appear differently to different users. In some examples, the format of the individual virtual spaces may appear differently based on which workspace a user is currently interacting with or most recently interacted with. In some examples, the format of the individual virtual spaces may appear differently for different users (e.g., based on personal configurations, group membership, etc.).

In at least one example, the user interface 142 can include a search mechanism 224, wherein a user can input a search term and the server(s) 102 can perform a search associated with the communication platform. In some examples, the search can be performed across each workspace with which the user is associated, or the search can be restricted to a particular workspace, based on a user specification. In some examples, results of the search may indicate a location of the search result (e.g., a workspace, a channel communication, etc.)

The user interface 142 is a non-limiting example of a user interface that can be presented via the user computing device 104 (e.g., by the application 138). In some examples, the application 138 can receive data from the messaging component 116, the audio/video component 118, and/or the workspace management component 120 and the application 138 can generate and present the user interface 142 based on the data. In other examples, the application 138 can receive data from the messaging component 116 and/or the audio/video component 118, and instructions for generating the user interface 142 from the messaging component 116, the audio/video component 118, and/or the workspace management component 120. In such an example, the application 138 can present the user interface 142 based on the instructions. Additional or alternative data can be presented via a user interface and additional or alternative configurations can be imagined.

As described above, users may be associated with multiple channels and workspaces. To facilitate cross-collaboration between users of various groups and organizations, users may communicate via shared channels. However, due in part to a shared channel's association with a workspace, the shared channel may include limitations on functionality for certain users associated with the shared channel. Thus, a solution presents itself in shared workspaces, which allow users associated with different workspaces to collaborate in a shared environment. In at least one example, the user interface 142 can include user interface element 226 that can be selectable such that, when selected or otherwise actuated, can cause the application 138 to present another user interface element 228, depicted in FIG. 2B.

Figure 2B:
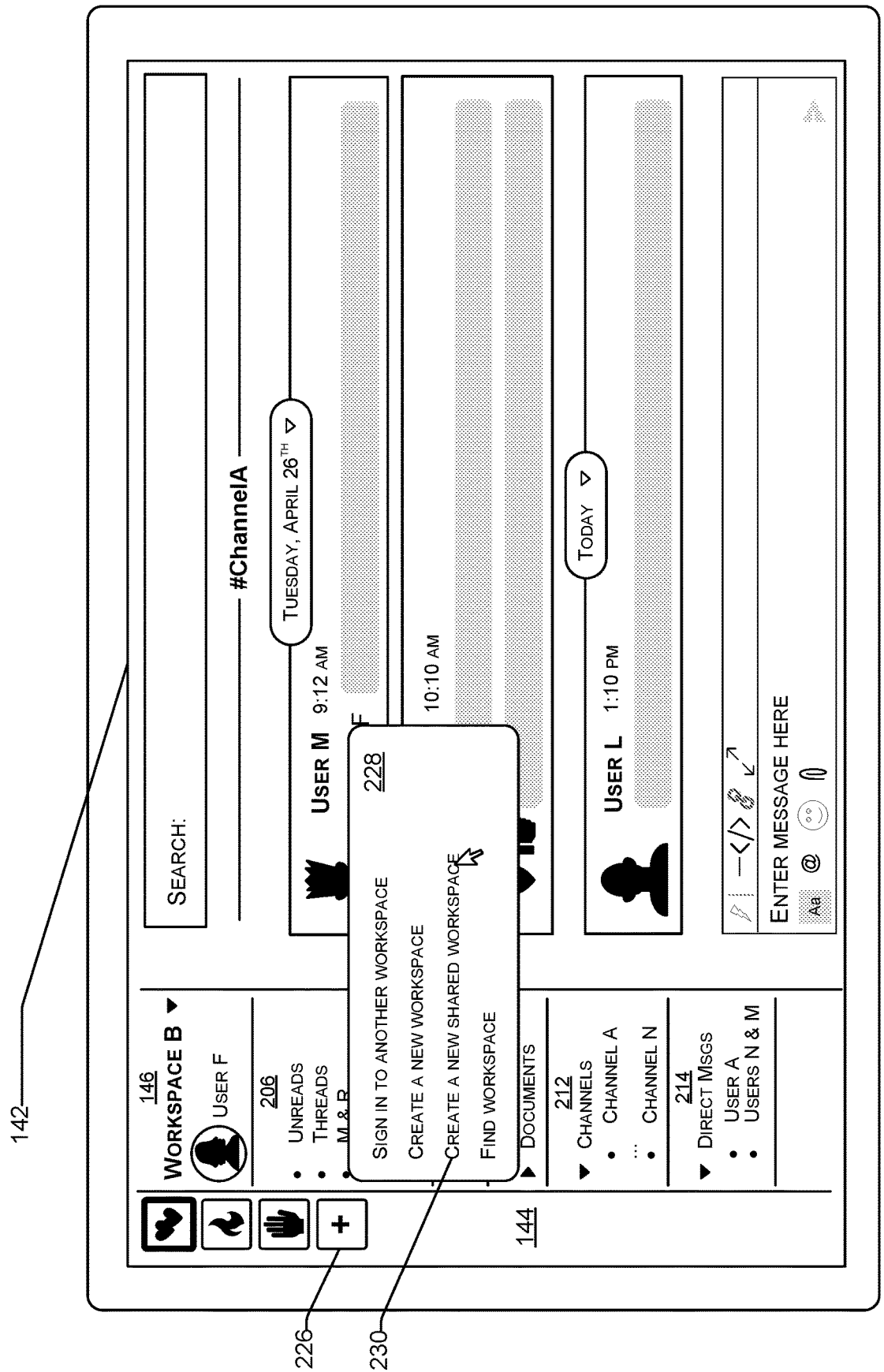
FIG. 2B illustrates another example of the user interface described in FIG. 2A associated with generating a shared workspace, as described herein.

FIG. 2B illustrates the user interface 142 including the user interface element 228 associated with adding a new workspace. In at least one example, the application 138 can detect the selection, or other actuation, of the user interface element 226 and can send an indication of such to the server(s) 102. The messaging component 116 can send an instruction to cause the user interface element 226 to be presented. In FIG. 2B, the user interface element 228 is presented as a pop-up, but in additional or alternative examples, the user interface element 228 can be presented as an overlay, an additional user interface, or the like.

In at least one example, the user interface element 228 can include one or more selectable options associated with workspaces. For example, the user interface element 228 may present one or more options associated with signing into a different existing workspace (i.e., switching from the current workspace illustrated, Workspace B, to a different existing workspace, such as that associated with indicators 200 and 204), creating a new traditional workspace, creating a new shared workspace, and finding a new workspace, to name a few non-limiting examples. The one or more options may be associated with one or more selectable icons that may be associated with their respective features. For example, the option to create a new shared workspace may be associated with a selectable control 230 such that, in response to a selection of the selectable control 230, a user interface associated with creating a new, shared workspace may be presented, as illustrated in FIG. 2C.

Figure 2C:
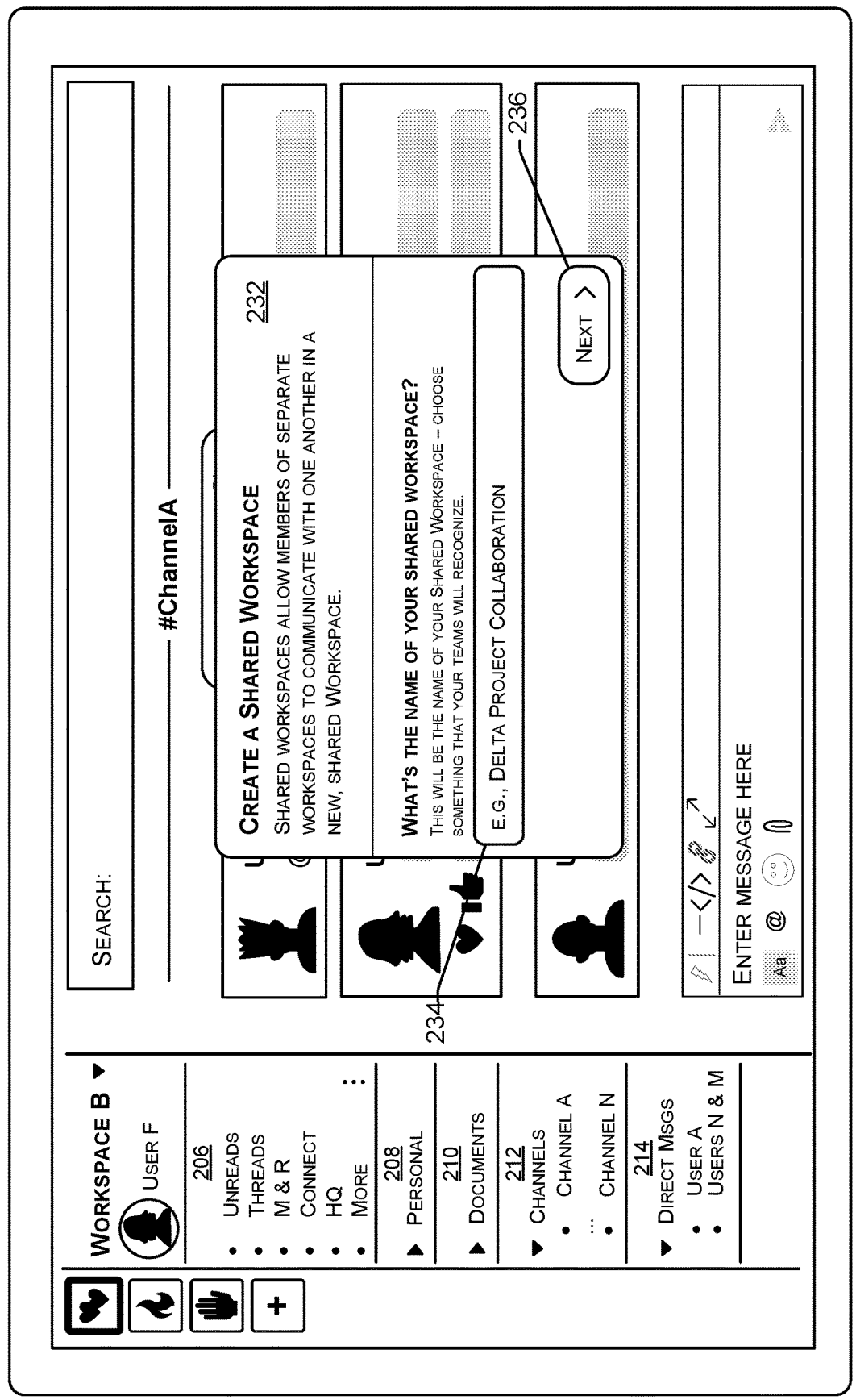
FIG. 2C illustrates another example of the user interface described in FIG. 2A associated with naming a shared workspace, as described herein.

FIG. 2C illustrates an example of user interface 142 including a user interface element 232 associated with naming a shared workspace. For example, based at least in part on receiving an input associated with the user interface 228, such as a selection of the selectable control 230 to create a new shared workspace, the application 138 may present user interface element 232 usable to create a shared workspace. Although the current embodiment illustrates receiving the input from User F via Workspace B, this is not intended to be so limiting, and the application 138 may receive an input from any user associated with any workspace. In some examples, the user interface element 232 may include an input mechanism 234 in which a user may name the shared workspace. Additionally or alternatively, the user interface element 232 may, in some examples, include a selectable "next" element 236 that, in response to a selection by a user, may allow the user to proceed in creating a shared workspace.

Figure 2D:
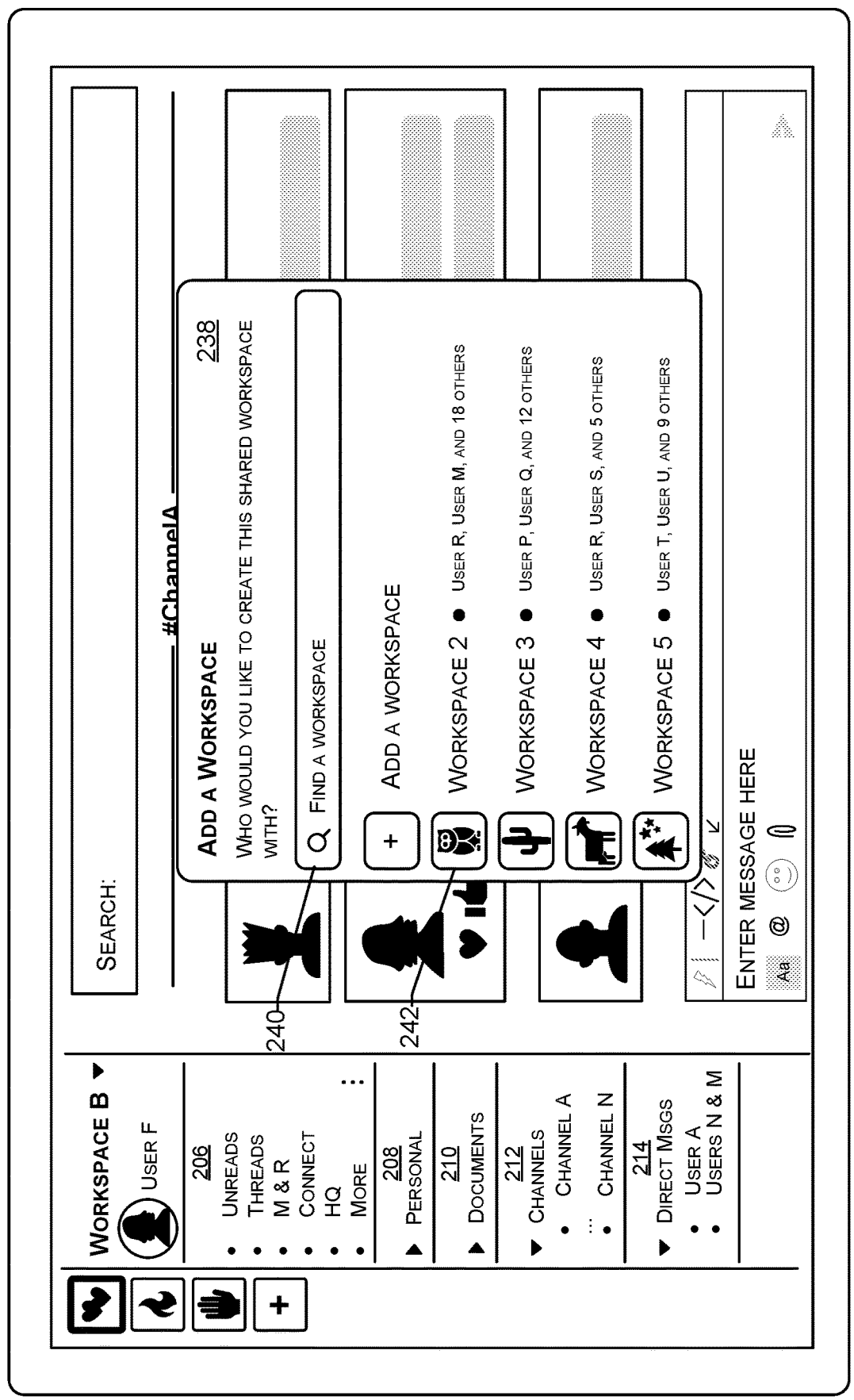
FIG. 2D illustrates another example of the user interface described in FIG. 2A associated with adding a second workspace to a shared workspace, as described herein.

FIG. 2D illustrates another example of user interface 142 including a user interface element 238 usable for selecting a workspace to create a shared workspace with (i.e., add to the shared workspace). For example, as described above, a first user associated with a first workspace (in the current illustration, User F associated with Workspace B) may select a second workspace in which to create a shared workspace with, wherein the shared workspace will be accessible at least to the first user associated with the first workspace (e.g., User F) and at least the second user associated with the second workspace (e.g., User R associated with Workspace 2). In at least one example, the user interface element 238 can include an input mechanism, illustrated in the current embodiment as a selectable control 240, to enable a user to identify which workspace(s) to add to the shared workspace. In some examples, the user can input an identifier of another workspace to be added to the shared workspace. Such an identifier can be a mention, a workspaceID, a channelID associated with the workspace, an email address associated with a user associated with the workspace, or the like.

Additionally or alternatively, the user interface element 238 may include one or more recommended workspaces illustrated as selectable icons, such as Workspace 2 selectable control 242 such that one or more additional workspaces may easily and quickly be identified. In some examples, the user interface element 238 may include an indication of one or more users associated with the one or more additional workspaces. While illustrated as a list in FIG. 2D, user workspace options can be selected using checkboxes, dropdown lists, list boxes, buttons, toggles, text fields, date fields, time fields, or the like. In at least one example, based at least in part on detecting an input associated with the user interface element 238, the application 138 can send an indication of the input(s) (e.g., identifier(s) provided, selection(s) regarding context data, etc.) to the server(s) 102 and the workspace management component 120 can generate a new shared workspace (via interactions with the messaging component 116). Additional details are provided below.

FIG. 3A illustrates an example interface 300 of a new, shared workspace ("Shared Workspace"). While illustrated as a workspace shared between two workspaces, a shared workspace may be shared to and/or associated with any number of workspaces. In some examples, the shared workspace may have the same or similar features as to a traditional workspace, such as second region 146 illustrated in FIGS. 2A-2D. For example, the shared workspace may include a first region 302, or pane, similar to the first region 144 illustrated in FIGS. 2A-2D. The first pane 302 may include indicator(s) (e.g., user interface element(s) or object(s)) of workspace(s) with which the user (e.g., account of the user) is associated. As illustrated in FIG. 3A, the user (e.g., User F) can be associated with four different workspaces, including one shared workspace. In at least one example, each workspace can be associated with a different indicator. In some examples, a user account of the user (e.g., User F) can be associated with group identifiers that correspond to each of the workspaces (e.g., as determined by the user/org data and/or the virtual space data 128). As such, the user account of the user can be associated with each of the workspaces. Thus, the shared workspace may include identifiers corresponding to workspaces that the user (e.g., User F) was previously associated with. For example, the first pane 302 can include the first indicator 200 representing a first workspace, the second indicator 202 can represent the second workspace, and the third indicator 204 can represent the third workspace. In some examples, the first panel 302 may include identifiers corresponding to shared workspaces, such as indicator 304. As illustrated in FIG. 3A, the user (e.g., User F) is currently interacting with the shared workspace, which is indicated by the indicator 304 representing the shared workspace being outlined in a heavier weight than the indicators 200, 202, and 204.

Similar to the second region 146 of user interface 142 illustrated in FIGS. 2A-2D, the user interface 300 may include a second region 306, or pane, similar to the second region 146 illustrated in FIGS. 2A-2D. Similar to the second region 146, the second region 306 of the shared workspace may include indicator(s) (e.g., user interface element(s) or object(s)) representing virtual space(s) associated with the workspace(s) with which the user (e.g., account of the user) is associated. In at least one example, the second region 306 can include one or more sub-sections, or sub-panes, which can represent different virtual spaces. These sub-sections may be the same or similar to those in the second region 146 described in FIGS. 2A-2D. For example, a first sub-section 308 of the shared workspace can include indicators representing virtual spaces that can aggregate data associated with a plurality of virtual spaces of which the user is a member. In at least one example, each virtual space can be associated with an indicator in the second region 306. In some examples, an indicator can be associated with an actuation mechanism (e.g., affordance) such that when actuated, can cause the application 138 to present data associated with the corresponding virtual space via a third region 318.

As illustrated in the second region 306, virtual spaces can be associated with a same type of event and/or action. For example, "threads" can be associated with messages, files, etc. posted in threads to messages posted in a virtual space, and "mentions and reactions," or "M & R" can be associated with messages or threads where the user (e.g., User F) has been mentioned (e.g., via a tag) or another user has reacted (e.g., via an emoji, reaction, or the like) to a message or thread posted by the user. In some examples, virtual spaces can be associated with facilitating communications between a user and other users of the communication. For example, "connect" can be associated with enabling the user to generate invitations to communicate with one or more other users. In some examples, a virtual space can be associated with a group (e.g., organization, team, etc.) headquarters (e.g., administrative or command center). For example, "HQ" can be associated with an interface including a list of indicators associated with virtual spaces configured to enable associated members to communicate. Additionally or alternatively, although not illustrated, the user can be associated with one or more boards, collaborative documents, and/or canvases with which the user is associated.

In at least one example, the second region 306 of the user interface 300 can include a second subsection 310, or sub-pane, that may be the same or similar to the second subsection 208 illustrated in FIGS. 2A-2D. In some examples, the second subsection 310 can be associated with personal documents that are associated with the user account.

In at least one example, the second region 306 of the user interface 300 can include a third subsection 312, or sub-pane, that may be the same or similar to the third subsection 210. In some examples, the third subsection 312 can, in some examples, be associated with collaborative documents associated with the user account of the user. That is, a "documents" subsection can include affordances associated with one or more collaborative documents of which the user is a member.

In at least one example, the second region 306 of the user interface 300 can include a fourth subsection 314, or sub-pane, that is the same or similar to the fourth subsection 212. In some examples, the fourth subsection 314 can include indicators representing communication channels. The communication channels can include public channels, private channels, shared channels (e.g., between groups or organizations), single workspace channels, cross-workspace channels, combinators of the foregoing, or the like. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces. For example, while accessing a shared workspace, such as that illustrated in FIG. 3A, the indicators representing the communication channels in the fourth subsection 314 may be communication channels that a user is associated with, including workspaces other than that the user is currently accessing. For example, as illustrated in FIGS. 2A-2D, the user (e.g., User F) is associated with Channels A through Channels N, which may be associated with the workspaces associated with the indicators 200, 202, and 204. However, upon creating the shared workspace, the user (e.g., User F), while in the shared workspace, still has the ability to access Channels A through Channels N, as depicted in the fourth subsection 314. Alternatively, in some examples and although not illustrated in FIG. 3A, the communication channels represented can be associated with a single workspace and communication channels associated with the single workspace.

In at least one example, the second region 306 can include a fifth sub-section 316, or sub-pane, that is the same or similar to the fifth subsection 214. In some examples, the fifth sub-section 316 can include indicators representative of communications with individual users or multiple specified users (e.g., instead of all, or a subset of, members of an organization). Such communications can be referred to as "direct messages." That is, the fifth sub-section 316, or sub-pane, can include indicators representative of virtual spaces that are associated with private messages between one or more users.

As described above, in at least one example, the user interface 300 can include a third region 318, or pane, which may be the same or similar to the third region 148 in FIGS. 2A-2D. In some examples, the third region 318 can be associated with a feed indicating messages posted to and/or actions taken with respect to a virtual space associated with the shared workspace (e.g., a virtual space associated with direct message communication(s), a virtual space associated with communication channel communication(s), a virtual space associated with collaborative document communication(s) (e.g., via a messaging or chat interface within a collaborative document), a virtual space associated with audio and/or video communications, etc.) for facilitating communications. As described above, in at least one example, data associated with the third region 318 can be associated with the same or different workspaces. That is, in some examples, the third region 318 can present data associated with the same or different workspaces via an integrated feed. In some examples, the data can be organized and/or is sortable by time, type of action, virtual space, user, or the like. In some examples, such data can be associated with an indication of which user posted the message and/or performed an action. In examples where the third region 318 presents data associated with multiple workspaces or other virtual spaces, at least some data can be associated with an indication of which workspace or other virtual space the data is associated with.

In some examples, the user interface 300 can include a search mechanism 320, wherein a user can input a search term and the server(s) 102 can perform a search associated with the communication platform. In some examples, the search can be performed across each workspace with which the user is associated, including both traditional workspaces (e.g., Workspace B, illustrated in FIGS. 2A-2D) and shared workspaces (e.g., Shared Workspace illustrated in the current embodiment). Alternatively, the results of the search may be restricted to a particular workspace (e.g., Shared Workspace). In some examples, results of the search may indicate a location of the search result (e.g., a workspace, a channel communication, etc.).

The user interface 300 is a non-limiting example of a user interface that can be presented via the user computing device 104 (e.g., by the application 138). In some examples, the application 138 can receive data from the messaging component 116, the audio/video component 118, and/or the workspace management component 120 and the application 138 can generate and present the user interface 300 based on the data. In other examples, the application 138 can receive data from the messaging component 116 and/or the audio/video component 118, and instructions for generating the user interface 142 from the messaging component 116, the audio/video component 118, and/or the workspace management component 120. In such an example, the application 138 can present the user interface 300 based on the instructions. Additional or alternative data can be presented via a user interface and additional or alternative configurations can be imagined.

In some examples, a user can create a channel in a shared workspace. For example, the first user (e.g., User F) and/or the second user (e.g., User R) who is a member of the shared workspace (e.g., Shared Workspace) can add a new channel. However, this is not intended to be so limiting, and, in some examples, any user associated with the shared workspace can create a channel (pending permissions, as described above and below). In some examples, the fourth subsection 314 can include a user interface element 322 associated with generating a new channel. For example, the user interface element 322 can be selectable such that, when selected or otherwise actuated, can cause the application 138 the present another user interface element 324. In at least one example, the application 138 can detect the selection, or other actuation, and can send an indication of such to the server(s) 102. The messaging component 116 can send an instruction to cause the user interface element 324 to be presented. In some examples, such an instruction can be associated with a "request" for information that can be provided via the user interface element 326. In FIG. 3A, the user interface element 324 is presented as a pop-up, but in additional or alternative examples, the user interface element 324 can be presented as an overlay, an additional user interface, or the like.

In some examples, the user interface element 324 can present one or more selectable options associated with adding a channel to the shared workspace. For example, the user interface element 324 may include a user interface element 326 associated with creating a new channel. A selection of the user interface element 326 may, in some examples, cause the application 138 to present another user interface element 330 associated with creating a new channel in the shared workspace. In some examples, the user interface element 330 may include one or more input fields in which the user creating the channel can name the channel and add a description for the channel. For example, based at least in part on receiving the request to generate the new channel, the application 138 may send, to the workspace management component 120, a request to generate a new channel in the shared workspace. The workspace management component 120 may then generate group identifiers associated with the new channel, and may associate the new channel group identifiers to shared workspace identifiers.

In some examples, a channel may already exist which may be relevant to the shared workspace but may not be associated with the shared workspace. Thus, it may be desirable for a user to merge an existing channel to a workspace. For example, a selection of the selectable icon 328 associated with merging an existing channel may cause the application 138 to present another user interface element associated with merging an existing channel with a shared workspace, as described below in FIG. 3B.

In some examples, and although not illustrated, the user interface element 330 may include one or more options associated with permissions of the new channel. As described above, permissions can be associated with elements of a communication platform, such as channels and workspaces. For example, permissions can indicate restrictions on individual channels, such as restrictions on user(s) associated with the individual channels, content associated with individual channels, and the like. In some examples, mapping permissions may be automatic, and may include associating permission data of the shared workspace to the new channel such that the new channel has the same or similar permissions as the shared workspace. For example, a selection of the "create" user interface element 332 may cause the application 138 to map, or otherwise associate, permission data associated with the shared workspace to the new channel, thereby automatically assigning the new channel the same or similar permissions as the shared workspace.

In other examples, a user associated with the shared workspace may determine permissions associated with the channel. The user may be the first user (e.g., User F) or the second user (e.g., user R). Additionally or alternatively, the use may be any member of the shared workplace. For example, although not illustrated, a selection of the "create" user interface element 334 may cause the application 138 to present an interface associated with designating permissions to the new channel. For example, the user interface may include one or more selectable controls associated with one or more permissions of the new channel, such as restrictions on certain members of the shared workspace (e.g., ability for users to post content to the channel, add users to the channel, remove users, etc.), content associated with the channel (e.g., restrictions on content posted to the channel), and the like.

In some examples, the channel may include geographic residency data. For example, geographic residency data can be data that is stored in accordance with an organization's (e.g., Acme Corporation) storage policy and at a specific geographic server. In some examples, an organization may be outside of a geographic region (e.g., external organization), but may need access to the geographic residency data. Thus, in some examples, the geographic residency data can be copied to a temporary server associated with the external organization. The data can be accessed and, in some examples, deleted from the temporary server once finished.

Figure 3B:
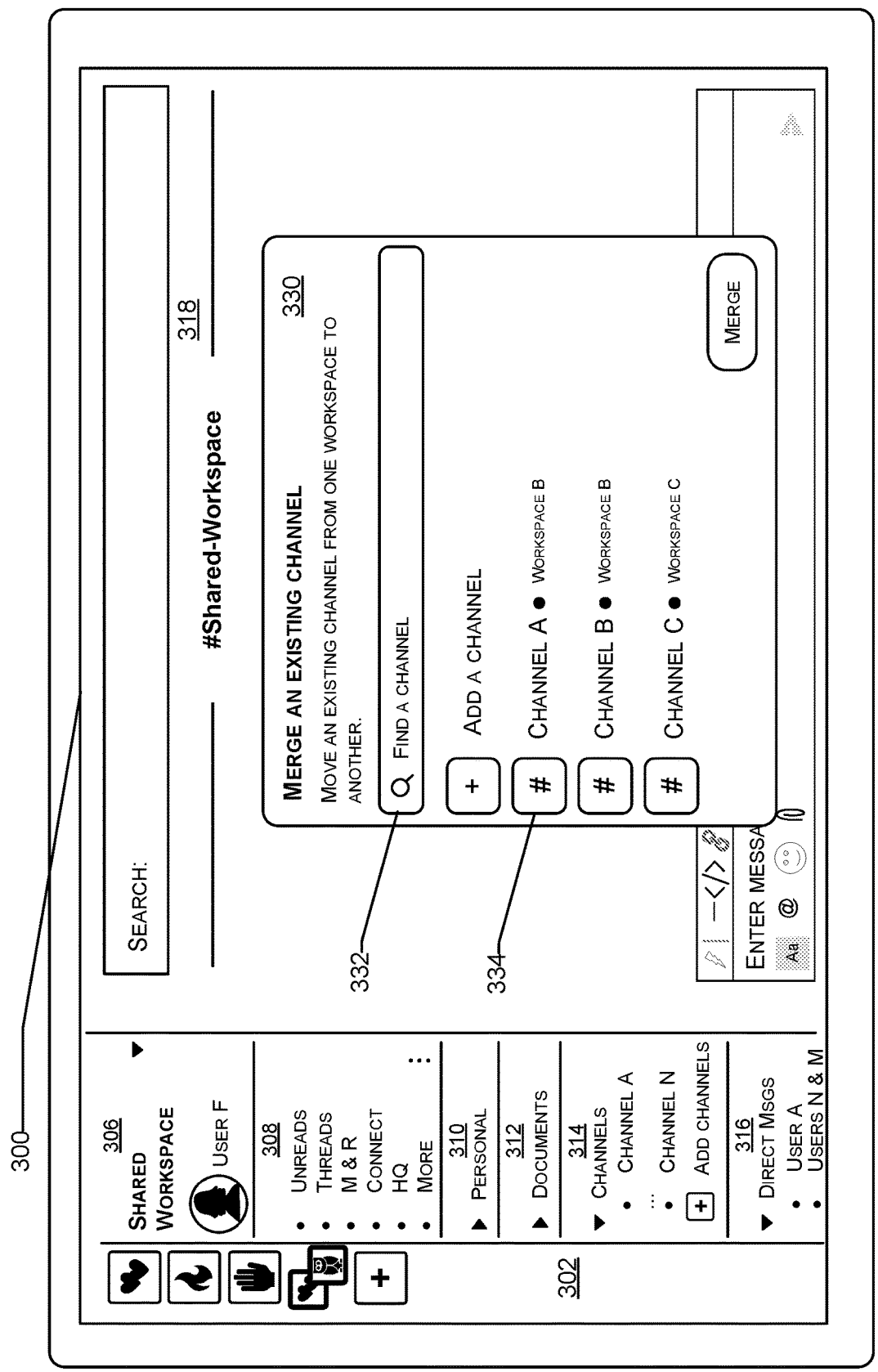
FIG. 3B illustrates another example of a user interface associated with merging an existing channel to a shared workspace, as described herein.

FIG. 3B illustrates an example interface 300 including a user interface element 330 associated with merging an existing channel to a shared workspace. The existing channel may be associated with the first workspace (e.g., Workspace B), the second workspace (e.g., Workspace 2). However, this is not intended to be so limiting, and the channel may be associated with any workspace. In at least one example, the user interface element 330 can include an input mechanism, illustrated in the current embodiment as a user interface element 332, to enable a user to identify which existing channel(s) to add to the shared workspace. Similar to that described above with regard to creating a new channel in the shared workspace, any member of the shared workspace may request to merge an existing channel. In some examples, the user can input an identifier of a channel to be added to the shared workspace. Such an identifier can be a mention, a channel ID, a workspaceID associated with the channel, an email address associated with a user associated with the channel, or the like.

Additionally or alternatively, the user interface element 330 may include one or more recommended channels illustrated as selectable icons, such as Channel A user interface element 334 such that one or more additional workspaces may easily and quickly be identified. In some examples, the user interface element 330 may include an indication of one or more users associated with the second workspace. While illustrated as a list in FIG. 3B, user channel options can be selected using checkboxes, dropdown lists, list boxes, buttons, toggles, text fields, date fields, time fields, or the like. In at least one example, based at least in part on detecting an input associated with the user interface element 330, the application 138 can send an indication of the input(s) (e.g., identifier(s) provided, selection(s) regarding context data, etc.) to the server(s) 102 and the workspace management component 120 can associate the channel to the shared workspace (via interactions with the messaging component 116).

In some examples, the channel can be located in the first workspace (e.g., Workspace B), or the second workspace (e.g., Workspace 2). In other examples, the channel may be associated with any workspace. In some examples, such as that of a private channel, the requesting user (e.g., User F) may not have access to the channel to be merged. Thus, in response to a selection of the channel, the network(s) 106 may cause a notification to be sent to a member of the channel requesting permission for the channel to be shared to the shared workspace.

In some examples, similar to creating a new channel in the shared workspace, permissions may be associated with the merged channel. For example, in response to receiving a request to associate an existing channel with the shared workspace, the workspace management component 120 may determine a first set of permissions associated with the existing channel and a second set of permissions associated with the shared workspace. In some examples, the permissions associated with the shared workspace may be determined by the first user and/or the second user upon generation of the shared workspace, as described above in FIG. 3A. In some examples, merging the existing channel with the shared workspace may include assigning the second set of permissions associated with the shared workspace to the channel in the shared workspace. In other words, the channel added to the shared workspace may have the same or similar permissions to that of the shared workspace. Alternatively, in some examples, the channel may retain one or more permissions associated with it. For example, merging the shared channel may include assigning the second set of permissions to the new channel.

Figure 4:
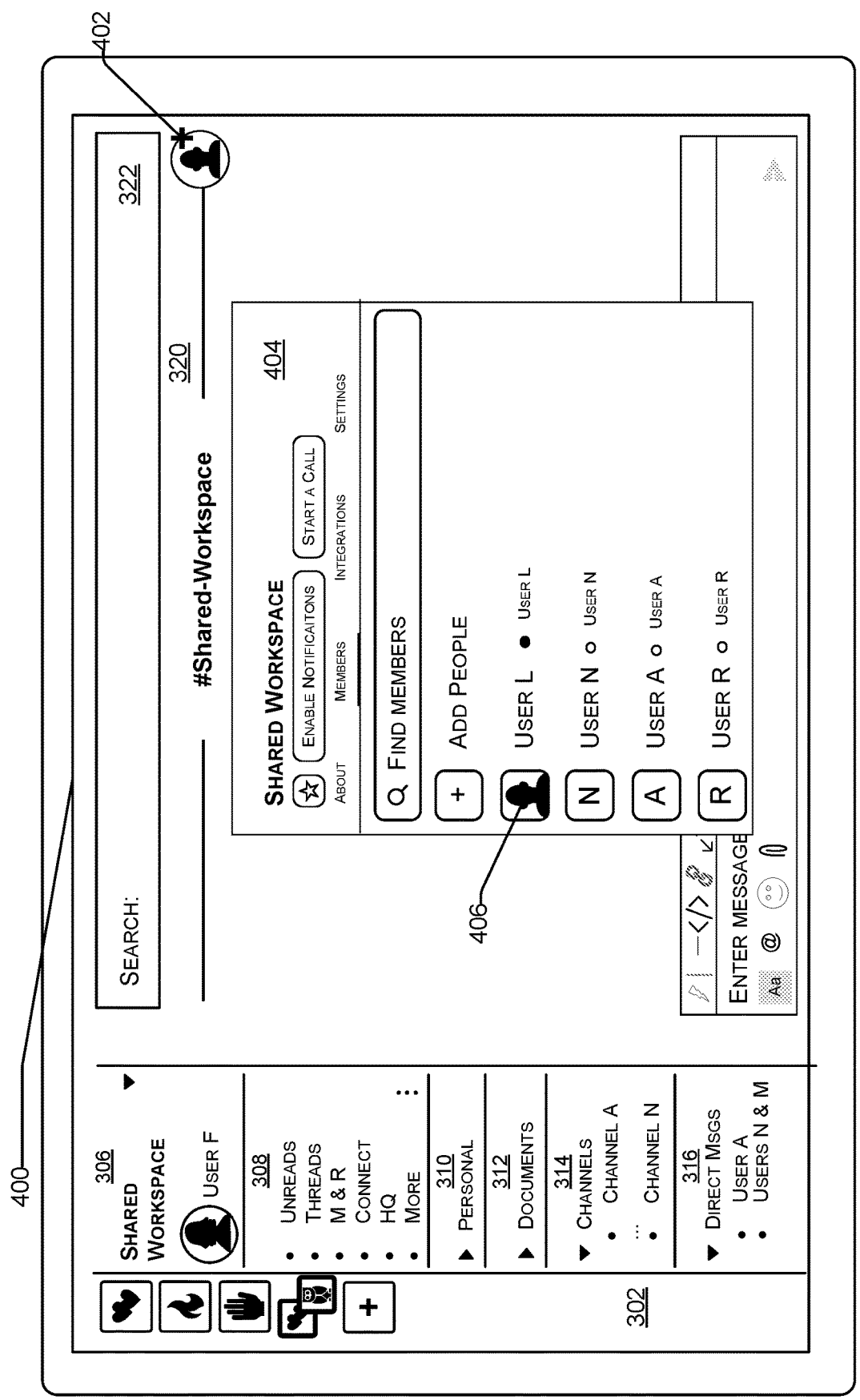
FIG. 4 illustrates an example of a user interface associated with adding a user to a shared workspace, as described herein.

FIG. 4 illustrates an example user interface 400 associated with adding a user to the shared workspace ("Shared Workspace"). The example user interface 400 may be the same or similar to user interfaces 142 and 300 illustrated in FIGS. 1-3B. In some examples, the user interface 400 may include a user interface element 402 associated with adding and/or removing a user to the shared workspace. For example, the user interface element 402 can be selectable such that, when selected or otherwise actuated, can cause the application 138 to present another user interface element 404. In at least one example, the application can detect the selection, or other actuation, and can send an indication of such to the server(s) 102. The messaging component 116 can send an instruction to cause the user interface 404 to be presented. In some examples, such an instruction can be associated with a "request" for information that can be provided via the user interface element 326. In FIG. 4, the user interface element 404 is presented as a pop-up, but in additional or alternative examples, the user interface element 404 can be presented as an overlay, an additional user interface, or the like.

In at least one example, the user interface element 404 can include an input mechanism to enable a user to identify a third user to add (or remove) from the shared workspace. In some examples, the user can input an identifier of another user to be added to the shared workspace. Such an identifier can be a mention, a userID, an email address, or the like. Additionally or alternatively, the user interface element 404 may include one or more recommended users illustrated as selectable icons, such as User L selectable control 406 such that one or more additional users may easily and quickly be identified. While illustrated as a scrollable list in FIG. 4, user options can be selected using checkboxes, dropdown lists, list boxes, buttons, toggles, text fields, date fields, time fields, or the like. In some examples, the third user may be a member of the first workspace (e.g., Workspace B), the second workspace (e.g., Workspace 2), a workspace different than the first workspace and the second workspace, and/or a guest channel not associated with a workspace.

In some examples, although not illustrated, a user may be removed from the shared workspace. For example, members of the shared workspace can be removed from the shared workspace via a similar process as described above. In at least one example, a user associated with the shared workspace can interact with a user interface presented via the user computing device 104 to request to remove a user from the shared workspace. In some examples, the request may come from the first user or the second user. Alternatively, the request may be from any member of the shared workspace. For privacy and security purposes, the messaging component 116 may not be able to remove the user from the shared workspace. Instead, in at least one example, the messaging component may generate a new shared workspace, via the workspace management component 120, wherein members of the new shared workspace comprise members that have not been added and/or requested to be removed. In at least one example, the messaging component can receive a request to remove a user from a shared workspace and can send a request back to the user computing device 104, requesting the user to identify which user(s) to remove (e.g., by providing an identifier associated therewith).

In some examples, the third account may have the same or different permissions associated with the shared workspace as the first account and/or the second account. Permissions can be associated with elements of the communication platform, such as channels and workspaces. In some examples, permissions can be associated with an individual user, and can place restrictions on the user's ability to interact with channels and/or workspaces. Permissions may include, for example, which channels a user is permitted to access, restrictions on individual channels, restrictions on content, restrictions on abilities to add and/or remove users, and restrictions on posting content, to name a few non-limiting examples.

In some examples, the third account may have the same permissions in the shared workspace as the first account and the second account. For example, in response to receiving a request from the first account and/or the second account to add the third account to the shared workspace, the network(s) 106 can map the permissions associated with the third account within the user/org data 126. Additionally or alternatively, the first user and/or the second user can determine permissions associated with the third account. For example, although not illustrated, in response to a selection of a third user (e.g., a selection of the User L selectable control 406), the user interface 400 may include a user interface element associated with permissions of the third user. The user interface element may include one or more options associated with permissions such as the ability to add new users to the shared workspace, remove users from the shared workspace, post content to the shared workspace, and create channels in the shared workspace, to name a few non-limiting examples.

The user interface 142 described above with reference to FIGS. 1-4 is a non-limiting example of a user interface that can be presented via the user computing device 104 (e.g., by the application 138). In some examples, the application 138 can receive data from the messaging component 116 and/or the workspace management component 120, and the application 138 can generate and present the user interface 142 based at least in part on the data. In other examples, the application 138 can receive data and/or instructions for generating the user interface 142 from the messaging component 116 and/or the workspace management component 120. In such an example, the application 138 can present the user interface 142 based at least in part on the instructions. Additional or alternative data can be presented via a user interface and additional or alternative configurations can be imagined.

Figure 5:
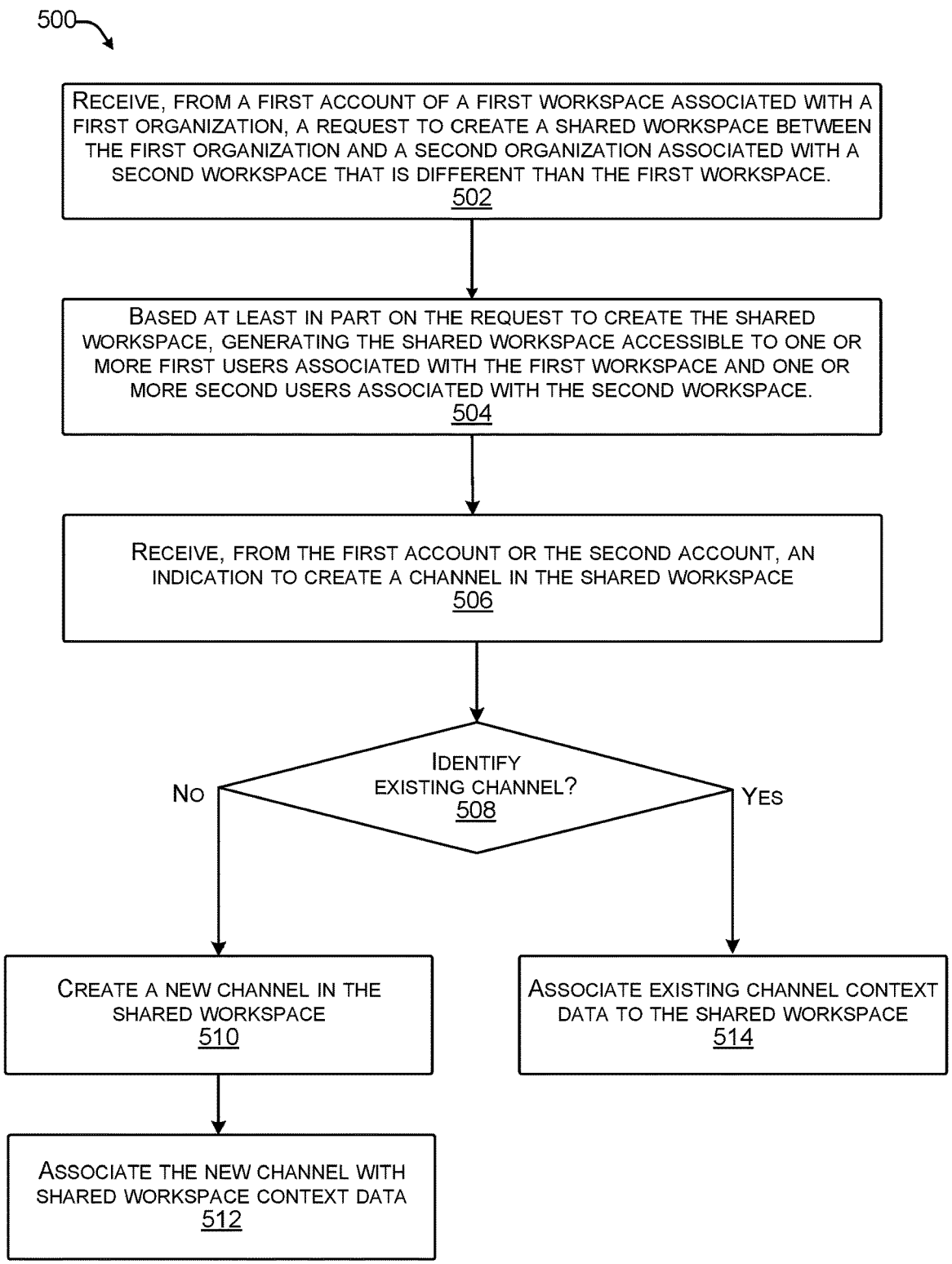
FIG. 5 illustrates an example process for generating a shared workspace and creating a channel therein, as described herein.
Figure 6:
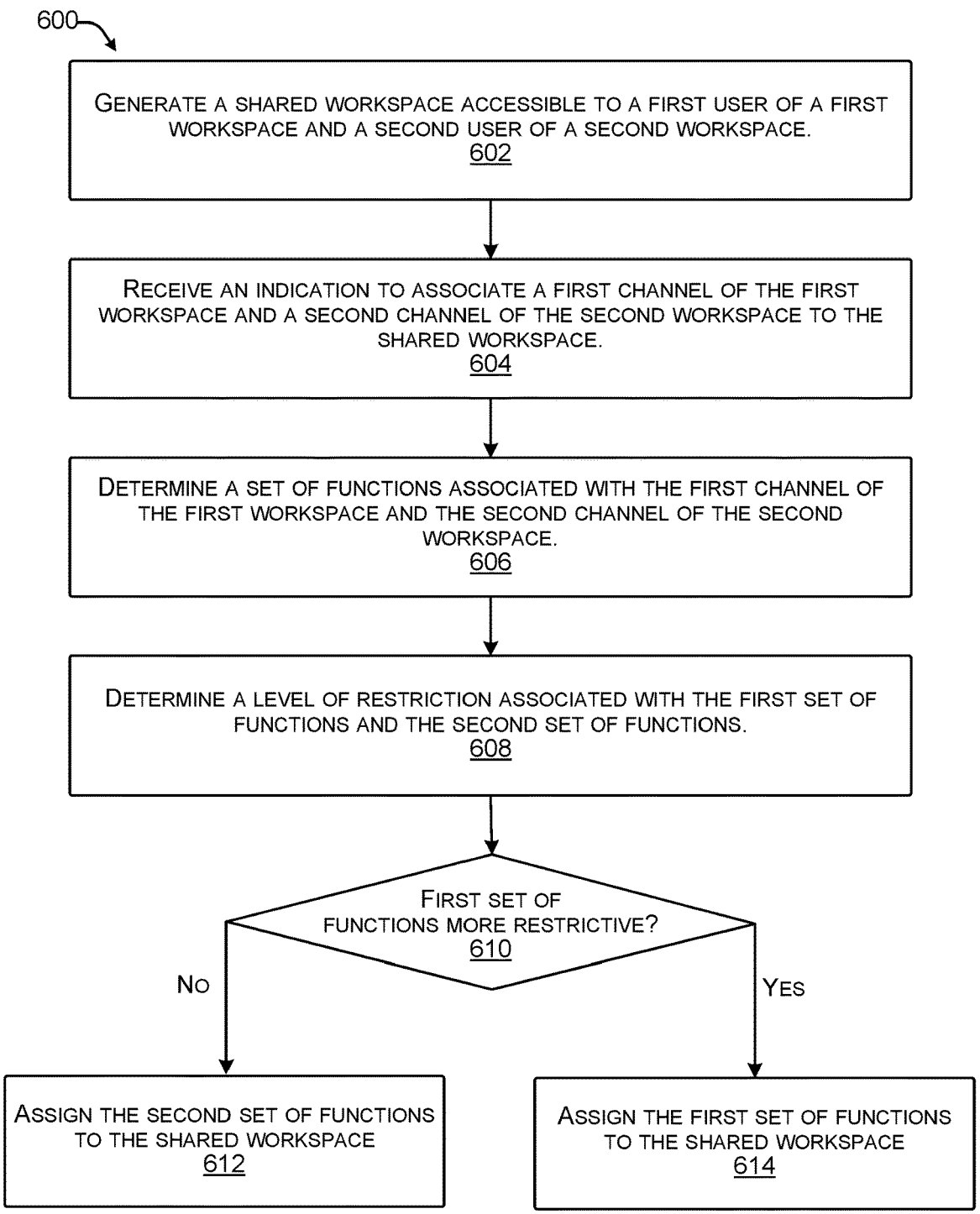
FIG. 6 illustrates an example process for determining permissions associated with a shared workspace, as described herein.

FIGS. 5 and 6 are flowcharts showing example processes involving techniques as described herein. The processes illustrated in FIGS. 5 and 6 are described with reference to components described above with reference to the environment 100 shown in FIG. 1 for convenience and ease of understanding. However, the processes illustrated in FIGS. 5 and 6 are not limited to being performed using the components described above with reference to the environment 100. Moreover, the components described above with reference to the environment 100 are not limited to performing the processes illustrated in FIGS. 5 and 6.

The processes in FIGS. 5 and 6 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 5 and 6 can be combined in whole or in part with each other or with other processes.

FIG. 5 illustrates an example process 500 for generating a shared workspace and creating a channel therein, as described herein.

At operation 502, the messaging component 116 can receive, from a first account of a first workspace associated with a first organization, a request to create a shared workspace between the first organization and a second organization associated with a second workspace. In some examples, the second workspace may be different than the first workspace. For example, the workspace may be a communication platform which may offer a secure and virtual space for groups of users, defined by user identifiers, to chat, meet, call, collaborate, transfer files, or otherwise communicate between or one another. In some examples, a shared workspace may represent a traditional workspace in that it may allow users to collaborate. However, in some examples, a shared workspace may include users of two or more workspaces.

At operation 504, based at least in part on the request to create the shared workspace, the messaging component 116 can generate the shared workspace. In some examples, the shared workspace may be accessible to one or more first users associated with the first workspace and one or more second users associated with the second workspace.

At operation 506, the messaging component 116 may receive, from the first account or the second account, an indication to create a channel in the shared workspace. In some examples, a channel may be a group based communication workspace that may be accessible and viewable to a select group of users, such as those associated with a workspace. In some examples, a workspace may include one or more channels.

At operation 508, the application 138 may send, to the workspace management component, a request to identify an existing channel associated with the request to create a channel in the shared workspace. For example, a selectable icon 328 presented via user interface element 324 can enable the first user and/or the second user to merge an existing channel with the shared workspace. Alternatively, in some examples, an option 326 presented via user interface element 324 can enable the first user and/or the second user to create a new channel.

At operation 510, the workspace management component 120 may create a new channel in the shared workspace. For example, if the workspace management component 120 does not identify an existing channel (i.e., "no" at operation 508), the application 138 may send, to the workspace management component 120, a request to generate a new channel in the shared workspace. The workspace management component 120 may then generate group identifiers associated with the new channel, and may associate the new channel group identifiers to shared workspace identifiers.

At operation 512, the workspace management component 120 can associate the new channel with context data associated with the shared workspace, thereby creating a new channel in the shared workspace. In some examples, the channel may be accessible to the first user and/or the second user. Additionally, or alternatively, the channel may be accessible to any member of the shared workspace.

At operation 514, the workspace management component 120 can associate existing channel context data to the shared workspace. For example, the workspace management component 120 may determine that a channel may already exist which may be relevant to the shared workspace (i.e., "yes" at 508). However, the shared channel may not be associated with the shared workspace, making it desirable for a user to merge an existing channel to a workspace. In some examples, a selection of the selectable icon 328 associated with merging an existing channel may cause the application 138 to present another user interface element associated with merging an existing channel with a shared workspace. For example, user interface element 330 may include one or more selectable controls associated with one or more existing channels. Based at least in part on receiving an indication of a selection of the one or more selectable controls associated with the one or more existing channels, the workspace management component 120 may associate channel data associated with the existing channel to the shared workspace, thereby merging the channel with the shared workspace.

FIG. 6 illustrates an example process 600 for determining permissions associated with a shared workspace, as described herein.

At operation 602, the workspace management component 120 may generate a shared workspace accessible to a first user of a first workspace and a second user of a second workspace. In some examples, as described above at operation 504. For example, the messaging component 116 can receive, from a first account of a first workspace associated with a first organization, a request to create a shared workspace between the first organization and a second organization associated with a second workspace. In some examples, the second workspace may be different from the first workspace. For example, the workspace may be a communication platform which may offer a secure and virtual space for groups of users, defined by user identifiers, to chat, meet, call, collaborate, transfer files, or otherwise communicate between or one another. In some examples, a shared workspace may represent a traditional workspace in that it may allow users to collaborate. However, in some examples, a shared workspace may include users of two or more workspaces. In some examples, based at least in part on the request to create the shared workspace, the messaging component 116 can generate the shared workspace. The shared workspace may be accessible to one or more first users associated with the first workspace and one or more second users associated with the second workspace. In some examples, the messaging component 116 may receive, from the first account or the second account, an indication to create a channel in the shared workspace. In some examples, a channel may be a group based communication workspace that may be accessible and viewable to a select group of users, such as those associated with a workspace. In some examples, a workspace may include one or more channels.

At operation 604, the workspace management component 120 may receive an indication to associate a first channel of the first workspace and a second channel of the second workspace to the shared workspace. For example, based at least in part on generating the shared workspace, described in operation 602, one or more channels associated with the first workspace and one or more channels associated with the second workspace may be associated with the shared workspace. In some examples, associating the channels may be automatic and in response to generating the shared workspace. Alternatively, the first user and/or the second user may determine a channel from the first workspace and/or second workspace to associate to the shared workspace.

At operation 606, the workspace management component 120 may determine a set of functions associated with the first channel of the first workspace and the second channel of the second workspace. In some example, functions can be associated with elements of a communication platform, such as channels and workspaces, and can functions comprise controls associated with a management of the workspace, such as a retention policy, channel creation permissions, channel sharing permissions, channel membership permissions, and/or content permissions, to name a few non-limiting examples. For example, permissions can indicate restrictions on individual channels, such as restrictions on user(s) associated with the individual channels, content associated with individual channels, and the like.

At operation 608, the workspace management component 120 may determine a restriction score associated with the first set of functions and the second set of functions. A restriction score may, in some examples, indicate how restrictive a channel may be. For example, a restrictive channel may have limited functionality, or limited permissions, as they relate to users and/or a workspace. A high restriction score may correlate to a low number of functions, including permissions, thus resulting in a high restrictive score. Alternatively, a low restriction score may indicate a high level of functions, including permissions, resulting in more channel functionality.

At operation 610, the workspace management component may compare the first set of functions and the second set of functions to determine whether the first set of functions are more restrictive than the second set of functions (i.e., the first set of functions having a higher restriction score than the second set of functions) or whether the first set of functions is the same or less restrictive than the second set of functions (e.g., the first set of functions having a same or lower restriction score than the second set of functions).

At operation 612, the workspace management component 120 may assign the second set of functions to the shared workspace (e.g., "no" at operation 610). For example, the workspace management component 120 may determine that the second set of functions are more restrictive than the first set of functions (i.e., the first set of functions has a same or lower permission score than the second set of functions). Based at least in part on determining that the second set of functions are more restrictive, the workspace management component 120 may assign the second set of functions to the shared workspace.

At operation 614, the workspace management component 120 may assign the first set of functions to the shared workspace (e.g., "yes" at operation 610). For example, the workspace management component 120 may determine that the first set of functions are more restrictive than the second set of functions (i.e., the second set of functions has a lower permission score than the first set of functions). Based at least in part on determining that the second set of functions are more restrictive, the workspace management component 120 may assign the first set of functions to the shared workspace.

Although the current illustration describes the workspace management component 120 assigning, to the shared workspace, the set of functions associated with a greater number of permissions (i.e., a lower restriction score), thereby affording the shared workspace the functions associated with the least restrictive channel, this is not intended to be so limiting. In some examples, the workspace management component 120 may assign, to the shared workspace, the set of functions associated with a lower number of permissions (i.e., a lower restriction score), thus maintaining the functions associated with the more restrictive channel.

As described above with reference to FIGS. 1-6, techniques described herein are directed to streamlining generation of shared workspaces available to one or more users of various workspaces. As described above, techniques described herein enable users to create and manage shared workspaces via a streamlined and efficient process. Therefore, these techniques provide for a faster "conversion" process (i.e., "converting" a workspace communication to a new shared workspace communication). Furthermore, techniques described herein provide user accounts with similar control regarding the functionality of the workspace, allowing users of both workspaces the ability to manage aspects of the workspace. As such, the techniques described herein provide improvements to existing computing processes by streamlining the creation of new, shared workspaces.

EXAMPLE CLAUSES

A: A method, implemented at least in part by one or more computing devices of a communication platform, the method comprising: receiving, from a first account of a first workspace associated with a first organization, a request to create a shared workspace between the first organization and a second organization associated with a second workspace that is different than the first workspace, wherein the first workspace comprises a first set of functions and the second workspace comprises a second set of functions; based at least in part on the request to create the shared workspace, generating the shared workspace, wherein the shared workspace is accessible to one or more first users associated with the first workspace and one or more second users associated with the second workspace; assigning a set of permissions to interact with the shared workspace to the one or more first users and the one or more second users based at least in part on the one or more first users and the one or more second users being associated with the shared workspace; receiving, from the first account or a second account of the second organization, an indication to create a channel in the shared workspace; and generating the channel in the shared workspace, wherein the channel is accessible by the first account and the second account in accordance with the set of permissions.

B: The method of paragraph A, further comprising: receiving, from at least one of the first account or the second account, an indication to associate a third account with the shared workspace; and based at least in part on receiving the indication, associating the third account with the shared workspace.

C: The method of paragraph B, wherein the third account is associated with at least one of: the first workspace; the second workspace; a third workspace different than the first workspace and the second workspace; or a guest channel.

D: The method of paragraph B or C, further comprising: receiving, from at least one of the first account or the second account, an indication to remove the third account from the shared workspace; and removing the third account from the shared workspace.

E: The method of any of paragraphs A-D, wherein the shared workspace is associated with a set of functions, comprising controls associated with at least one of: a retention policy; channel creation permissions; channel sharing permissions; channel membership permissions; or content permissions.

F: The method of any of paragraphs A-E, wherein the channel includes geographic residency data.

G: The method of any of paragraphs A-F, wherein the first workspace includes a second channel and the second workspace includes a third channel, wherein the generating the shared workspace includes copying at least a portion of data associated with the second channel and a portion of data associated with the third channel to the shared workspace.

H: The method of paragraph G, wherein copying at least a portion of the data associated with the second channel and a portion of the data associated with the third channel to the shared workspace includes: determining first set of permissions associated with the second channel; and determining a second set of permissions associated with the third channel; wherein copying at least a portion of the data associated with the second channel and a portion of the data associated with the third channel includes assigning one of the first set of permissions or the second set of permissions to the shared workspace.

I: The method of any of paragraphs B-H, wherein the third account is associated with a third workspace different than the first workspace and the second workspace, the third workspace comprising a second channel, the method further comprising: receiving, from the third account, an indication to share the second channel to the shared workspace, wherein sharing the second channel to the shared workspace includes copying at least a portion of data associated with the second channel to the shared workspace such that the portion of the data associated with the second channel is accessible by at least one of the first account, the second account, or the third account.

J: The method of any of paragraphs A-I, further comprising: displaying, via at least one user device associated with the first account, a graphical user interface comprising a first portion of content from the first workspace and a second portion of content from the shared workspace at a same time.

K. One or more computer-readable media comprising instructions that, when executed by one or more processors, cause the one or more processors to perform operations comprising: receiving, from a first account of a first workspace associated with a first organization, a request to create a shared workspace between the first organization and a second organization associated with a second workspace that is different than the first workspace, wherein the first workspace comprises a first set of functions and the second workspace comprises a second set of functions; based at least in part on the request to create the shared workspace, generating the shared workspace, wherein the shared workspace is accessible to one or more first users associated with the first workspace and one or more second users associated with the second workspace; assigning a set of permissions to interact with the shared workspace to the one or more first users and the one or more second users based at least in part on the one or more first users and the one or more second users being associated with the shared workspace; receiving, from the first account or a second account of the second organization, an indication to create a channel in the shared workspace; and generating the channel in the shared workspace, wherein the channel is accessible by the first account and the second account in accordance with the set of permissions.

L: The one or more computer-readable media of paragraph K, the operations further comprising: receiving, from at least one of the first account or the second account, an indication to associate a third account with the shared workspace; and based at least in part on receiving the indication, associating the third account with the shared workspace.

M: The one or more computer-readable media of paragraph L, wherein the third account is associated with at least one of: the first workspace; the second workspace; a third workspace different than the first workspace and the second workspace; or a guest channel.

N: The one or more computer-readable media of paragraph L or M, the operations further comprising: receiving, from at least one of the first account or the second account, an indication to remove the third account from the shared workspace; and removing the third account from the shared workspace.

O: The one or more computer-readable media of any of paragraphs K-N, wherein the shared workspace is associated with a set of functions, comprising controls associated with at least one of: a retention policy; channel creation permissions; channel sharing permissions; channel membership permissions; or content permissions.

P: The one or more computer-readable media of any of paragraphs K-O, wherein the channel includes geographic residency data.

Q. A system associated with a communication platform, wherein the system comprises: one or more processors; and one or more non-transitory computer-readable media comprising instructions that, when executed by the one or more processors, cause the system to perform operations comprising: receiving, from a first account of a first workspace associated with a first organization, a request to create a shared workspace between the first organization and a second organization associated with a second workspace that is different than the first workspace, wherein the first workspace comprises a first set of functions and the second workspace comprises a second set of functions; based at least in part on the request to create the shared workspace, generating the shared workspace, wherein the shared workspace is accessible to one or more first users associated with the first workspace and one or more second users associated with the second workspace; assigning a set of permissions to interact with the shared workspace to the one or more first users and the one or more second users based at least in part on the one or more first users and the one or more second users being associated with the shared workspace; receiving, from the first account or a second account of the second organization, an indication to create a channel in the shared workspace; and generating the channel in the shared workspace, wherein the channel is accessible by the first account and the second account in accordance with the set of permissions.

R: The system of paragraph Q, wherein the first workspace includes a second channel and the second workspace includes a third channel, wherein the generating the shared workspace includes copying at least a portion of data associated with the second channel and a portion of data associated with the third channel to the shared workspace.

S: The system of paragraph R, wherein copying at least a portion of the data associated with the second channel and a portion of the data associated with the third channel to the shared workspace includes: determining first set of permissions associated with the second channel; and determining a second set of permissions associated with the third channel; wherein copying at least a portion of the data associated with the second channel and a portion of the data associated with the third channel includes assigning one of the first set of permissions or the second set of permissions to the shared workspace.

T: The system of any of paragraphs Q-S, further comprising: displaying, via at least one user device associated with the first account, a graphical user interface comprising a first portion of content from the first workspace and a second portion of content from the shared workspace at a same time.

While the example clauses described above are described with respect to one particular implementation, it should be understood that, in the context of this document, the content of the example clauses may also be implemented via a method, device, system, computer-readable medium, and/or another implementation. Additionally, any of examples A-T may be implemented alone or in combination with any other one or more of the examples A-T.

What is claimed is:

1. A method, implemented at least in part by one or more computing devices of a communication platform, the method comprising:
receiving, from a first account of a first workspace associated with a first organization, a request to create a shared workspace between the first organization and a second organization associated with a second workspace that is different than the first workspace, wherein:
the first workspace, having first workspace characteristics determined with a first workspace management component associated with the first workspace, comprises a first set of functions and a first plurality of channels;
the second workspace, having second workspace characteristics determined with a second workspace management component associated with the second workspace, comprises a second set of functions and a second plurality of channels;
the shared workspace comprises a third plurality of channels, wherein the third plurality of channels comprises a plurality of shared channels;
the first set of functions comprises controls associated with the first organization and configured to manage the first workspace;
the second set of functions comprises controls associated with the second organization and configured to manage the second workspace;
the first workspace and the second workspace similarly facilitate individualized communications within respective organizations;
individual channels of the first, second, and third pluralities of channels each, based at least in part on channel characteristics associated with each individual channel and determined with a workspace management component associated with the respective workspace, facilitate communication via a data feed similarly to other channels of the respective plurality of channels; and based at least in part on the request to create the shared workspace, generating the shared workspace, wherein the shared workspace is accessible to one or more first users associated with the first workspace and one or more second users associated with the second workspace and the shared workspace is generated with shared workspace characteristics based at least in part on the first workspace characteristics and the second workspace characteristics;

assigning a set of permissions to interact with the shared workspace to the one or more first users and the one or more second users based at least in part on the one or more first users and the one or more second users being associated with the shared workspace, wherein the set of permissions indicate shared control of the shared workspace by at least one of the one or more first users and at least one of the one or more second users;

receiving, from the first account or a second account of the second organization, an indication to create a channel in the shared workspace; and generating the channel in the shared workspace, wherein the channel in the shared workspace is accessible by the first account and the second account in accordance with the set of permissions.

2. The method of claim 1, further comprising:

receiving, from at least one of the first account or the second account, an indication to associate a third account with the shared workspace; and based at least in part on receiving the indication, associating the third account with the shared workspace.

3. The method of claim 2, wherein the third account is associated with at least one of:
the first workspace;
the second workspace;
a third workspace different than the first workspace and the second workspace; or
a guest channel.

4. The method of claim 2, further comprising:

receiving, from at least one of the first account or the second account, an indication to remove the third account from the shared workspace; and removing the third account from the shared workspace.

5. The method of claim 1, wherein the shared workspace is associated with a set of functions, comprising controls associated with at least one of:
a retention policy;
channel creation permissions;
channel sharing permissions;
channel membership permissions; or
content permissions.

6. The method of claim 1, wherein the channel in the shared workspace includes geographic residency data.

7. The method of claim 1, wherein the first workspace includes a second channel and the second workspace includes a third channel, wherein the generating the shared workspace includes copying at least a portion of data associated with the second channel and a portion of data associated with the third channel to the shared workspace.

8. The method of claim 7, wherein copying at least a portion of the data associated with the second channel and a portion of the data associated with the third channel to the shared workspace includes:
determining first set of permissions associated with the second channel; and
determining a second set of permissions associated with the third channel;
wherein copying at least a portion of the data associated with the second channel and a portion of the data associated with the third channel includes assigning one of the first set of permissions or the second set of permissions to the shared workspace.

9. The method of claim 2, wherein the third account is associated with a third workspace different than the first workspace and the second workspace, the third workspace comprising a second channel, the method further comprising:
receiving, from the third account, an indication to share the second channel to the shared workspace,
wherein sharing the second channel to the shared workspace includes copying at least a portion of data associated with the second channel to the shared workspace such that the portion of the data associated with the second channel is accessible by at least one of the first account, the second account, or the third account.

10. The method of claim 1, further comprising:
displaying, via at least one user device associated with the first account, a graphical user interface comprising a first portion of content from the first workspace and a second portion of content from the shared workspace at a same time.

11. One or more non-transitory computer-readable media comprising instructions that, when executed by one or more processors, cause the one or more processors to perform operations comprising:
receiving, from a first account of a first workspace associated with a first organization, a request to create a shared workspace between the first organization and a second organization associated with a second workspace that is different than the first workspace, wherein:
the first workspace, having first workspace characteristics determined with a first workspace management component associated with the first workspace, comprises a first set of functions and a first plurality of channels;
the second workspace, having second workspace characteristics determined with a second workspace management component associated with the second workspace, comprises a second set of functions and a second plurality of channels;
the shared workspace comprises a third plurality of channels, wherein the third plurality of channels comprises a plurality of shared channels;
the first set of functions comprises controls associated with the first organization and configured to manage the first workspace;
the second set of functions comprises controls associated with the second organization and configured to manage the second workspace;
the first workspace and the second workspace similarly facilitate individualized communications within respective organizations;
individual channels of the first, second, and third pluralities of channels each, based at least in part on channel characteristics associated with each individual channel and determined with a workspace management component associated with the respective workspace, facilitate communication via a data feed similarly to other channels of the respective plurality of channels; and based at least in part on the request to create the shared workspace, generating the shared workspace, wherein the shared workspace is accessible to one or more first users associated with the first workspace and one or more second users associated with the second workspace and the shared workspace is generated with shared workspace characteristics based at least in part on the first workspace characteristics and the second workspace characteristics;

assigning a set of permissions to interact with the shared workspace to the one or more first users and the one or more second users based at least in part on the one or more first users and the one or more second users being associated with the shared workspace, wherein the set of permissions indicate shared control of the shared workspace by at least one of the one or more first users and at least one of the one or more second users;

receiving, from the first account or a second account of the second organization, an indication to create a channel in the shared workspace; and generating the channel in the shared workspace, wherein the channel is accessible by the first account and the second account in accordance with the set of permissions.

12. The one or more non-transitory computer-readable media of claim 11, the operations further comprising:
receiving, from at least one of the first account or the second account, an indication to associate a third account with the shared workspace; and
based at least in part on receiving the indication, associating the third account with the shared workspace.

13. The one or more non-transitory computer-readable media of claim 12, wherein the third account is associated with at least one of:
the first workspace;
the second workspace;
a third workspace different than the first workspace and the second workspace; or
a guest channel.

14. The one or more non-transitory computer-readable media of claim 12, the operations further comprising:
receiving, from at least one of the first account or the second account, an indication to remove the third account from the shared workspace; and
removing the third account from the shared workspace.

15. The one or more non-transitory computer-readable media of claim 11, wherein the shared workspace is associated with a set of functions, comprising controls associated with at least one of:
a retention policy;
channel creation permissions;
channel sharing permissions;
channel membership permissions; or
content permissions.

16. A system associated with a communication platform, wherein the system comprises:
one or more processors; and
one or more non-transitory computer-readable media comprising instructions that, when executed by the one or more processors, cause the system to perform operations comprising:
receiving, from a first account of a first workspace associated with a first organization, a request to create a shared workspace between the first organization and a second organization associated with a second workspace that is different than the first workspace, wherein:
the first workspace, having first workspace characteristics determined with a first workspace management component associated with the first workspace, comprises a first set of functions and a first plurality of channels;
the second workspace, having second workspace characteristics determined with a second workspace management component associated with the second workspace, comprises a second set of functions and a second plurality of channels;
the shared workspace comprises a third plurality of channels, wherein the third plurality of channels comprises a plurality of shared channels;
the first set of functions comprises controls associated with the first organization and configured to manage the first workspace;
the second set of functions comprises controls associated with the second organization and configured to manage the second workspace;
the first workspace and the second workspace similarly facilitate individualized communications within respective organizations;
individual channels of the first, second, and third pluralities of channels each, based at least in part on channel characteristics associated with each individual channel and determined with a workspace management component associated with the respective workspace, facilitate communication via a data feed similarly to other channels of the respective plurality of channels; and
based at least in part on the request to create the shared workspace, generating the shared workspace, wherein the shared workspace is similarly accessible to one or more first users associated with the first workspace and one or more second users associated with the second workspace and the shared workspace is generated with shared workspace characteristics based at least in part on the first workspace characteristics and the second workspace characteristics;
assigning a set of permissions to interact with the shared workspace to the one or more first users and the one or more second users based at least in part on the one or more first users and the one or more second users being associated with the shared workspace, wherein the set of permissions indicate shared control of the shared workspace by at least one of the one or more first users and at least one of the one or more second users;
receiving, from the first account or a second account of the second organization, an indication to create a channel in the shared workspace; and
generating the channel in the shared workspace, wherein the channel is accessible by the first account and the second account in accordance with the set of permissions.

17. The system of claim 16, wherein the first workspace includes a second channel and the second workspace includes a third channel, wherein the generating the shared workspace includes copying at least a portion of data associated with the second channel and a portion of data associated with the third channel to the shared workspace.

18. The system of claim 17, wherein copying at least a portion of the data associated with the second channel and a portion of the data associated with the third channel to the shared workspace includes:
- determining first set of permissions associated with the second channel; and
- determining a second set of permissions associated with the third channel;
- wherein copying at least a portion of the data associated with the second channel and a portion of the data associated with the third channel includes assigning one of the first set of permissions or the second set of permissions to the shared workspace.

19. The system of claim 16, further comprising:
- displaying, via at least one user device associated with the first account, a graphical user interface comprising a first portion of content from the first workspace and a second portion of content from the shared workspace at a same time.

20. The method of claim 7, further comprising:
- based at least in part on copying the portions of data to the shared workspace, altering an indicator of at least one of the second channel or the third channel.

\* \* \* \* \*